United States Patent
Fujita et al.

(10) Patent No.: US 6,411,985 B1
(45) Date of Patent: Jun. 25, 2002

(54) INTERSERVER DATA ASSOCIATION APPARATUS

(75) Inventors: Kazuhiko Fujita; Toshiaki Kakisu; Yasuhiko Hashizume; Yuki Shinomiya, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,795

(22) Filed: Nov. 18, 1997

Related U.S. Application Data

(63) Continuation of application No. 08/408,834, filed on Mar. 23, 1995, now abandoned.

(30) Foreign Application Priority Data

May 10, 1994  (JP) .............................................. 6-096681

(51) Int. Cl.[7] .............................................. G06F 15/16
(52) U.S. Cl. ...................... 709/201; 709/245; 709/246; 707/204
(58) Field of Search ............................... 709/201, 245, 709/246; 707/104, 204

(56) References Cited

U.S. PATENT DOCUMENTS

| | | | | |
|---|---|---|---|---|
| 5,197,065 A | * | 3/1993 | Calvignac et al. | 370/378 |
| 5,333,183 A | * | 7/1994 | Herbert | 379/112 |
| 5,390,335 A | * | 2/1995 | Stephan et al. | 395/800 |
| 5,455,947 A | * | 10/1995 | Suzuki et al. | 395/650 |
| 5,499,367 A | * | 3/1996 | Bamford et al. | 395/600 |
| 5,515,502 A | * | 5/1996 | Wood | 395/182.13 |
| 5,530,855 A | * | 6/1996 | Satoh et al. | 395/600 |
| 5,544,359 A | * | 8/1996 | Tada et al. | 395/600 |
| 5,678,042 A | * | 10/1997 | Pisello et al. | 707/10 |

OTHER PUBLICATIONS

Microsoft Systems Management Server, (Microsoft SQL Server), Microsoft Corporation, 1988–1995, pp 341–401 and 1053–1067.*

* cited by examiner

*Primary Examiner*—Mehmet B. Geckil
(74) *Attorney, Agent, or Firm*—Staas & Halsey LLP

(57) ABSTRACT

An interserver data association apparatus capable of making data association with respect to a plurality of reception servers based on data transmitted from one transmission server. Transaction information about the manipulation of a database sent from a main center is received by an acquisition unit in the interserver data association apparatus. The data received by this acquisition unit is transferred to individual distribution buffers in a distribution unit. This distribution unit has information about the timings of data transmission requested by the individual reception servers. At the timing each reception server requests, therefore, the distribution unit transfers the transaction information stored in the distribution buffer associated with each reception server to that reception server.

11 Claims, 37 Drawing Sheets

| TRANSACTION IDENTIFIER (Ti) | MANIPULATION (Mj) | RESOURCE IDENTIFIER (Rk) | DATA (Dl) |

TIME

FIG. 6

Table A (10a):

| RESOURCE IDENTIFIER | DESTINATION |
|---|---|
| R1 | SERVER 1, SERVER 3 |
| R2 | SERVER 1, SERVER 2 |
| R3 | SERVER 2, SERVER 3 |

Table B:

| DESTINATION | TRIGGER |
|---|---|
| SERVER 1 | 10 PIECES |
| SERVER 2 | 5:00 |
| SERVER 3 | EVERY HOUR |

| SERVER 1 | SERVER 2 | SERVER 3 |
|----------|----------|----------|
| COMPLETE |          | COMPLETE |

FIG. 15

| DISTRIBUTION DEFINITION | DISTRIBUTION DEFINITION FOR SERVER 1 | DISTRIBUTION DEFINITION FOR SERVER 2 | DISTRIBUTION DEFINITION FOR SERVER 3 |
|---|---|---|---|
| RESOURCE IDENTIFIER | R1 | R2 | R1 |
|  | R2 | R3 | R3 |
| TRIGGER CONDITION | TEN PIECES | 5:00 | EVERY HOUR |

20b

INTERSERVER DATA ASSOCIATION APPARATUS

This application is a continuation of application Ser. No. 08/408,834, filed Mar. 23, 1995, now abandoned.

BACKGROUND OF THE INVENTION

1. Field of the Invention

The present invention relates generally to a data association apparatus for transmitting data among a plurality of servers, and, more particularly, to a data association apparatus for transferring information about an operation on a database, which has been executed by one transmission server, to a plurality of reception servers.

2. Description of the Related Art

Conventionally, a plurality of servers perform mutually associated data processing on a plurality of databases, such as backup processing, information system processing and batch processing.

The backup processing is executed, for example, for an on-line trading system in a bank. That is, in systems whose stopping services would cause significant social influences, such as a bank on-line system, a backup computer center (backup center) may be built at site remote from the main computer center, in case a computer center (main center) having a regular database for everyday use is downed due to a natural disaster, terrorism or the like. The backup computer center is provided with a backup database having the same contents as the regular database. In the system, every time the server in the main center updates the regular database, the updated contents are transmitted to the server in the backup center. The server in the backup center (which has the same capability as the server in the main center) renews the backup database in accordance with the transmitted updated contents to make the contents of the backup database consistent with those of the regular database. As the consistency of the contents of both databases is maintained, if the main center is downed, the backup center can take over the processing that has been performed by the main center.

The information system processing is executed to collectively manage the results of operations executed in the main business works. The results of operations executed in the main business works are important information for the company activities. Normally, a company builds such information into an information system and positions it as the company's strategic information system (SIS). In this respect, a database for information system is prepared in addition to the databases for the main business works. When server manipulates data for a main business work, the manipulation contents are collectively transmitted to the other server after the work is completed. The other server updates the database for information system by batch processing in accordance with the received manipulation contents. Since the results of a process executed by a main business work concentrate on the database for information system, the results can be managed collectively in the database for information system.

The batch processing is a process which is executed based on the results of the operations that have been carried out by the main business works. In a banking system, for instance, a telephone contact may be made to customers who had made large deposits in deposit and exchange business in the same day, or direct mails may be sent to such customers. Such works are premised on the process of preparing a list of customers who have made more than a certain deposit based on the results of the depositing business in the same day. This list making is executed as a batch process that is performed at the end of the business works in the day. When data of the main business works is manipulated by one server, therefore, the contents of this manipulation are collectively sent to the other server after all the business works are completed. The other server carries out the batch process in accordance with the received manipulation contents.

The procedures for associating data among a plurality of servers in this manner are classified into the following four groups depending on the system in which those servers are built and on the units of data exchanged among the servers.

First, a plurality of servers may be built up on the same computer system and all the records of data are transmitted collectively. In this case, a file which cannot be shared by servers is used in data transmission. More specifically, a transmission server opens such a file, writes all the records of data to be sent into the file, and temporarily closes the file after the writing of the data is completed. Next, a reception server opens this file and reads the stored data.

Second, a plurality of servers may be built up on different computer systems and all the records of data are transmitted collectively. In this case too, a file which cannot be shared by servers is used in data transmission. That is, a transmission server opens such a file, writes all the records of data to be sent into the file, and temporarily closes the file after the writing of the data is completed. This file is transmitted to a reception server by communications means. Upon reception of this file, the reception server opens the file and reads the stored data.

Third, a plurality of servers may be built up on the same computer system and data are transmitted record by record. In this case, a file or memory which can be shared by servers is used in data transmission. More specifically, a transmission server locks such a file or memory, writes one record of data to be transmitted in the file or memory, and then unlocks the file or memory. Next, a reception server locks this file or memory, reads one record of data stored therein, and then unlocks the file or memory. This data writing and reading are repeated until all the records are transmitted.

Fourth, a plurality of servers may be built up on different computer systems and data are transmitted record by record. In this case, a transmission server transmits data to be sent, record by record. A reception server receives the transmitted data record by record. This data writing and reading are repeated until all the records are transmitted.

In any case, the transmission server can send data only to one reception server. That is, the transmission server sends data only once. The transmission server should therefore make this single data transmission at the timing that the reception server could receive the data properly. By the way, there are multifarious types of data requested by reception servers. For example, one server may request the prompt transmission of data while another server may allow for a certain delay and may thus request one data transmission per day in order to suppress the number of processes. Accordingly, the transmission server cannot match the transmission timing with the timings requested by all the reception servers, and can synchronize the transmission timing only with the reception timing of only one reception server. The transmission server cannot therefore send data to a plurality of reception servers.

If a transmission server can output data multiple times simultaneously or in a time-shared manner, the data can be theoretically transmitted to a plurality of reception servers. This system however requires that every time a reception server is changed, the programs or system definitions in the transmission server should be altered. What is more, the burden on the transmission server is inevitably increased. Since the conventional data associating procedures are based on a fixed one-to-one association as explained above, the data flow is not smooth and cannot meet the multifarious requests by a plurality of reception servers. This is the first problem of the prior art.

The first and second procedures described above do not allow the reception server to be operated until the writing of all the records is completed, and cannot ensure parallel running of both transmission and reception servers. The first and second procedures are not therefore designed for the process that is requested immediately. By way of contrast, the third and fourth procedures described above can permit the parallel operation of both servers, but the reception server should be running while the transmission server is sending data. In other words, the transmitted data will be lost unless the reception server is running. Since the conventional associating procedures cannot allow for independent operations of the transmission server and reception server. This is the second problem of the prior art.

As the second and fourth procedures described above use communications means for data association, data itself may be lost during the transmission due to some accidental disconnection of the communications line or some other reasons. That is, it is difficult to guarantee the data reception on the reception server side. This is the third problem of the prior art.

Accordingly, it is a primary object of the present invention to provide an interserver data association apparatus which is designed to overcome the first conventional problem and which permits data association with respect to a plurality of reception servers based on data transmitted from one transmission server.

It is another object of the present invention to provide an interserver data association apparatus which overcomes the second and third conventional problems and which can maintain the independent operation of a reception server from that of a transmitting server and can prevent data from being lost.

SUMMARY OF THE INVENTION

To achieve the first object, according to the present invention, there is provided an interserver data association apparatus for transmitting contents of manipulation of a database in a transmission server to a plurality of reception servers, which comprises reception means for receiving data about the manipulation of the database sent from the transmission server; and distribution means for distributing the data, received by the reception means, to each reception server at a predetermined timing determined for each reception server.

The transmission server and reception servers in the present invention may be built on the same computer system or may be built on separate computer systems. That is, a server in the present invention can be grasped as an application program which performs one collective operation.

When individual servers are built on the same computer system, the interserver data association apparatus can also be built in this same computer system.

When individual servers are built on separate computer systems, however, the interserver data association apparatus may be built in the computer where the transmission server is located, or may be provided in a totally different system. In any case, the data exchange between computer systems is accomplished via communications means. To effect the data transmission via the communications means, the computer systems may be coupled directly or via communications lines.

The transmission server in the present invention has a function to manipulate a database, while each reception server may or may not have a function to manipulate a database. The reception servers need to be capable of doing some works based on the contents of the manipulation of a database sent from the transmission server. If a reception server has a database, this database may be processed by the function of the reception server to have the same contents as the database on the sender side so that it can be used as a backup database. Alternatively, the database of the reception server may be processed by the function of the reception server to have a different data structure from that of the database on the sender side.

The "manipulation of a database" in this invention includes events such as reference to, correction of, deletion of or addition to data stored in the database. Of course the database manipulation may include only some of those events.

The "data about the manipulation of a database" in the present invention is the information that specifies a transaction which has manipulated the database, the information that specifies a resource (data) in the database which has been manipulated, the type of an event (manipulation) of the database, the contents of data after the database manipulation, and so forth. This data may of course include only some of the mentioned information.

The reception means receives the data sent from the transmission server.

At this time, the reception means may process the received data. For instance, a transaction which is executed by the transmission server may manipulate a plurality of databases. In this case, however, the data to be sent to the interserver data association apparatus should not necessarily be arranged in the order of transactions for each database. The reception server however may execute the processes in the transaction order, so that the reception means may collectively process the data about the manipulation of the databases sent from the transmission server, transaction by transaction executed by the transmission server. In this case, when receiving all the data about the individual transactions, the reception means can collectively transfer those data to the unit of the subsequent stage.

Some definitions which define the conditions to acquire data through this reception means (acquisition definition and mapping definition) may be prepared so that data is obtained according to such definitions. Likewise, some definitions which define the conditions to group data for each transaction in the reception means (acquisition definition and mapping definition) may be prepared so that data is obtained according to such definitions.

The distribution means sends the data, transferred from the reception means, to individual reception servers. In this respect, the distribution means may be provided with buffers in association with the individual reception servers to store data immediately before being sent to the respective reception servers. This structure can allow the data to be held until the actual transmission to the individual reception servers. The buffers may be constituted of a volatile memory or a non-volatile memory.

The distribution means transmits data to each reception server at a predetermined timing specified for each reception server. Accordingly, some definitions which define the trigger conditions to send data to the reception servers (acquisition definition and mapping definition) may be prepared so that data is transmitted according to such definitions.

Since the above-described structure alone permits data, sent from the transmission server, to be transferred directly to the reception servers, each reception server should perform filtering to discard data which is not needed by that reception server itself. Accordingly, identification means may be provided between the reception means and the distribution means to discriminate only the data requested by each reception server from among all the data received by the reception means.

One identification means of this type may be provided in association with the reception means to selectively distribute the data, requested by each reception server, to the buffers of the associated reception servers. Alternatively, the identification means may be provided for the buffer of each reception server to selectively extract the data, requested by each reception server, from the reception unit (storage section and group buffers).

To effect the identification, some definitions which define the conditions of data requested by each reception server (acquisition definition and mapping definition) may be prepared so that data is identified according to such definitions.

While the first object is achieved by the above-described structure, the second object can further be achieved by further providing the storage section comprising a non-volatile medium (hard disk, EPROM, flash memory or the like) which time-sequentially stores data about the manipulation of the databases.

This storage section allows the reception servers, connected to the interserver data association apparatus, to be operated independently. For instance, the reception servers can function even while the transmission server is not running. In other words, even if the transmission server were not running at the time of the distribution which is previously requested to the distribution means, the data that should be received by a reception server still remains in the storage section so that the reception server can receive the data later. Even if the interserver data association apparatus is powered off, the data still exists in the storage section, thus permitting the operation time of the interserver data association apparatus to be set as desired.

Further, even when the transmission server and reception servers are built on different computer systems and data is transmitted via communications means to each reception server from the interserver data association apparatus, the transmitted data remains in the storage section and will not be lost by the accidental disconnection of the communications line.

This storage section may be located anywhere in the interserver data association apparatus. For example, the storage section may be arranged in the data transfer path from the reception means to the distribution means, or may be located at the end of a monitor route branching from the data transfer path. The former arrangement can guarantee the consistency of the data to be transmitted actually and the data stored in the storage section. The latter arrangement eliminates the need to access to the storage section on the data transfer path from the reception means to the distribution means, thus suppressing a time lag caused by the data transfer time.

When the interserver data association apparatus is equipped with the identification means, the storage section may be provided before or after the identification means. In the former case, the data received by the reception means is stored directly in the storage section, and the identification means discriminates only the data requested by a reception server from among the data stored in the storage section. This arrangement allows the data sent from the transmission server to be stored directly in the storage section, so that if data the reception server requests is changed, new needed data can be obtained easily. Further, a buffer into which the data read from the storage section is transferred may be provided so that the identification means can acquire only the data requested by the reception server from among the data written in the buffer and transfer the acquired data to the distribution means. With this arrangement, even if there are multiple reception servers and the identification means executes the identification for each reception server, a single access to the storage section is sufficient (accesses to the buffers should equal the number of reception servers), thus reducing the total amount of time for the access to the non-volatile medium.

In the latter arrangement of the storage section which is provided at the subsequent stage of the identification means, the data processed by the identification means to contain what is requested by each reception server is stored in the storage section. In this case, the storage section is prepared for each of the buffers provided in the distribution means in association with the individual reception servers.

The present invention can be used for data association between the server in the main center and a server in the backup center for bank services or the like, data association between a main business server and an information server, data association between a main business server and a batch processing server, and so forth.

The data about the manipulation of databases transmitted from the transmission server is received by the reception means. The data received by the reception means is transferred to the distribution means. This distribution means has information about the timing of data transmission requested by each reception server. At the timing each reception server requests, therefore, the distribution means transfers the data sent from the reception means to the reception server. If there are multiple reception servers, the distribution means executes the distribution process for each reception server. Even if there are multiple reception servers, the transmission server should only send data once at any given timing and need not perform data transmission according to each reception server. Therefore, the interserver data association apparatus intervening between transmission and reception servers can ensure data association between one server and a plurality of servers.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a diagram showing the structure of a mapping definition in the first embodiment of this invention;

FIG. 15 is a diagram showing the structure of each distribution definition in the second embodiment of this invention;

DETAILED DESCRIPTION OF THE PREFERRED EMBODIMENTS

Preferred embodiments of the present invention will now be described with reference to the accompanying drawings.

First Embodiment

Figure 1:
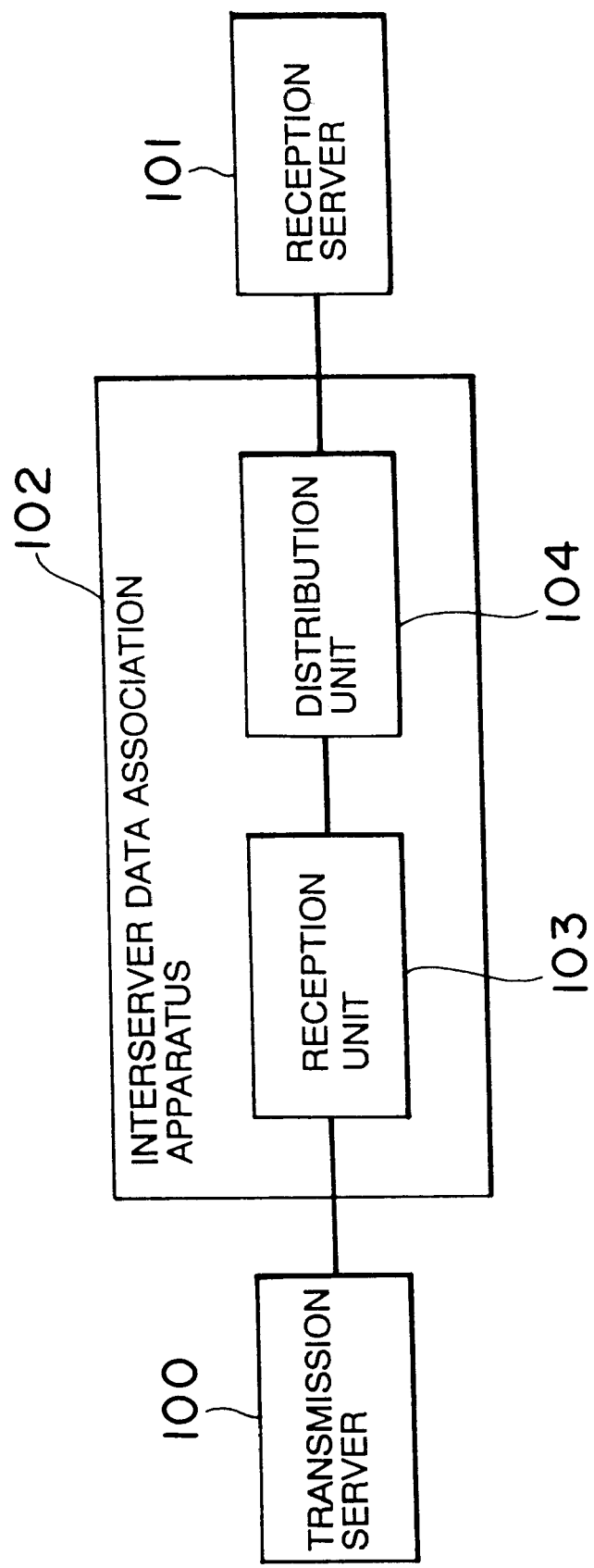
FIG. 1 is a diagram showing the principle of a first embodiment of the present invention.

The first embodiment is an interserver data association apparatus embodying the present invention intervening between servers which perform bank services. FIG. 1 schematically shows this embodiment. As shown in FIG. 1, an interserver data association apparatus 102 has a reception unit 103 and a distribution unit 104. The reception unit 103 receives transaction information from a transmission server 100 and transfers it to the distribution unit 104. The distribution unit 104 distributes the received transaction information to a reception server 101. The specific structures of those units will be described below.

<Connection with Servers>

Figure 2:
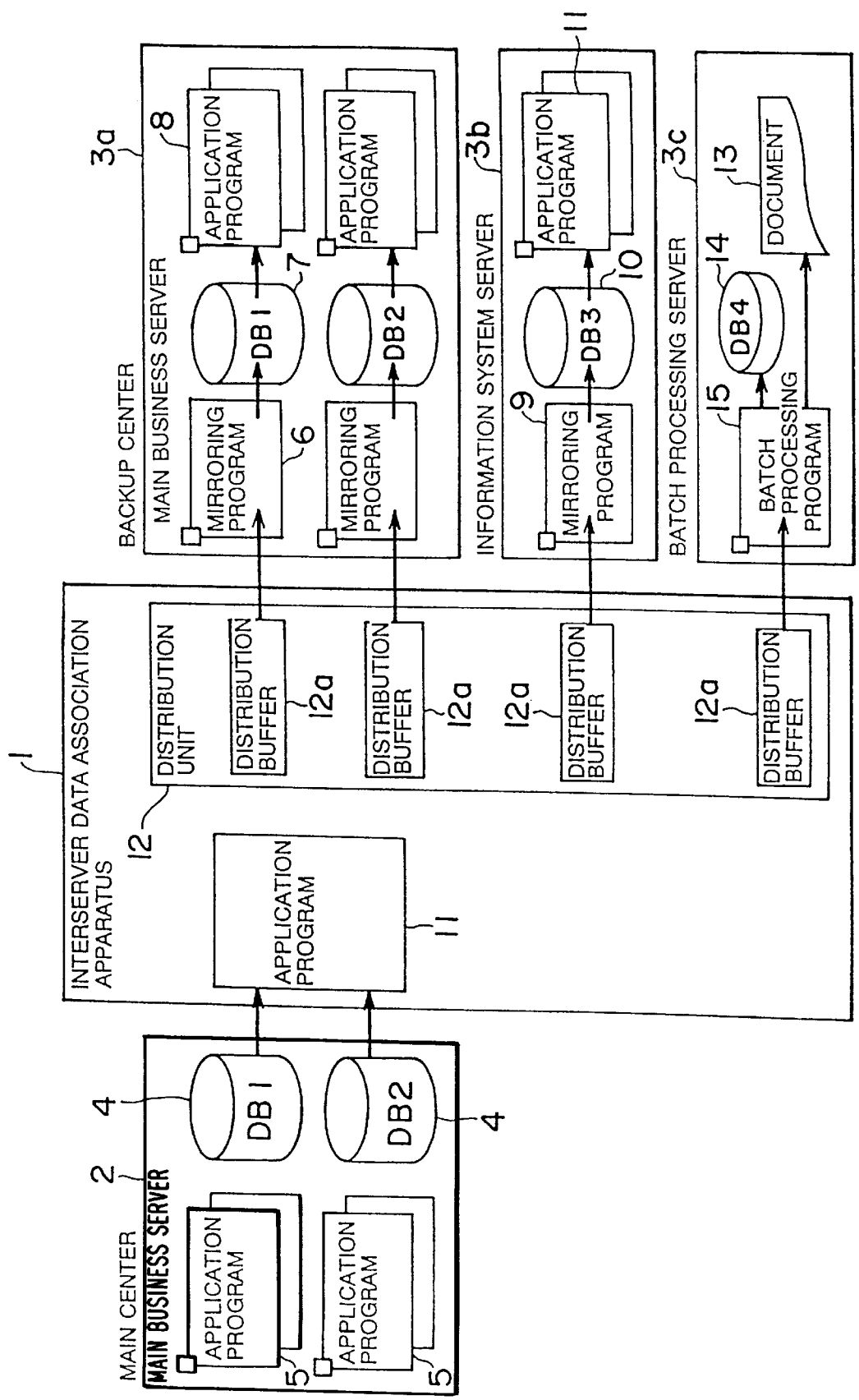
FIG. 2 is an explanatory diagram of the connection between an interserver data association apparatus according to the first embodiment of this invention and servers.

To begin with, the connection of servers to the interserver data association apparatus of this embodiment will be described. As shown in FIG. 2, a main center 2 incorporating a main business server is connected as a transmission server to an interserver data association apparatus 1. Also connected as reception servers to the interserver data association apparatus 1 are a backup center 3a incorporating a main business server, an information system server 3b and a batch processing server 3c.

[Main Center]

The main center 2 incorporates a server which performs main business services. This main business server incorporated in the main center 2 has two databases (DB-1 and DB-2) 4 containing data, such as customers' balance information. Each database 4 has a data structure according to a network type model. The main business server of the main center 2 runs an application program 5 to perform services, such as on-line transactions and deposit and withdrawal through an ATM (Automatic Teller Machine) and to manipulate those databases 4 (including reference, addition, correction and deletion). This application program 5 is a set of transactions. The "transaction" is an undividable sequence of processes which have a significance. The transaction is a basic unit of manipulation for databases. One can consider that a plurality of such transactions are executed in parallel to update the databases.

Figures 3, 4:
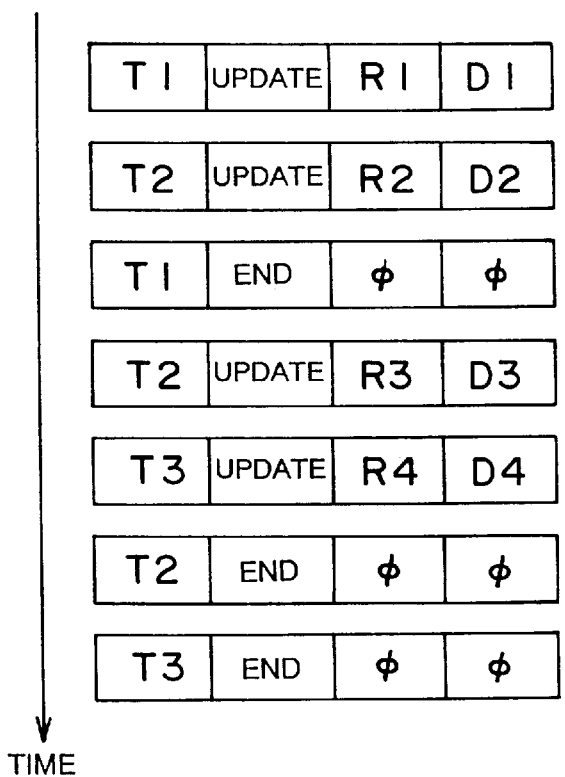
FIG. 3 is an explanatory diagram of the structure of transaction information.
FIG. 4 is an explanatory diagram showing the flow of transaction information transmitted from a transmission server.

When the main business server of the main center 2 runs the application program 5 to update the database 4, transaction information as shown in FIG. 3 is sent to the interserver data association apparatus 1 for each manipulation. In FIG. 3, the transaction information consists of four items, as one unit, which are a transaction identifier (Ti), manipulation classification (Mj), resource identifier (Rk) and data (Dl).

The transaction identifier (Ti) is the information which serves to identify a transaction and guarantees the significance and the ascendancy in the server. The letter "i" in the transaction identifier (Ti) is a variable which is substituted by a serial number. When a transaction occurs, a plurality of manipulations are normally performed on a plurality of resources during the period from the start to the end of the transaction. Every time each manipulation is performed, transaction information is prepared. The transaction identifier with the same variable is affixed to the manipulation about the same transaction. This variable is given as a serial number in the order of the occurrence of transactions. If the transaction identifier is the same, therefore, it is to be understood that the manipulation is for the same transaction. If the transaction identifier differs, it is apparent that the manipulation is for a different transaction and the order of that transaction can also be known. Accordingly, the main business server has a counter (not shown) and increments the count value to prepare the transaction identifier every time a transaction occurs.

The manipulation classification (Mj) is the information indicating the type of the manipulation. The letter "j" in the manipulation (Mj) is a variable which is substituted by a serial number. More specifically, M1 indicates the "reference," M2 indicates "updating" and M3 indicates "end of transaction." The type of the information (Mi) should previously be associated with commands in the database language (SQL, DML, etc.) each server uses. For instance, M1 is associated with "SELECT" in the SQL and "FIND" in the DML, and M2 is associated with "UPDATE" in the SQL and "MODIFY" in the DML. Since the type of a manipulation is expressed only by a symbol and a variable, if commands in each database language are extended in the future, it can easily be coped with an increase in the number of the associated Mj. The transaction information can be exchanged even between servers which use different database languages.

The resource identifier (Rk) is the information which guarantees the significance of a resource on which the manipulation is performed. If a resource is a relational database, for example, information of the combination of the schema name, table name and item name is written in the resource identifier (Rk).

Written in the data (Dl) is the contents of data obtained as a result of executing the manipulation on the resource identifier (Rk).

It is understood from the information of those four items that the transaction (Ti) performed a manipulation (Mj) on a resource (Rk) to yield data expressed by "Dl." The following description will be given on the premise that transactions T1, T2 and T3 have been executed in parallel with respect to a plurality of resources (R1, R2, R3 and R4) in individual databases (DB-1 and DB-2). In this case, transaction information about different transactions is output as single time-sequential data in a coexisting form in the order as shown in FIG. 4, for example. When the manipulation content indicates the end of the transaction (Mj), of course, there is no information to be stored in the resource identifier (Rk) and data (Dl). In this case, therefore, it is set to a NUL value ($\phi$).

[Backup Center]

The backup center 3a incorporates a main business server which takes over the main business works when the main center 2 is downed.

This main business server incorporated in the backup center 3a has databases (DB-1 and DB-2) 7 which are full copies of the databases (DB-1 and DB-2) 4. Each database (DB-1, DB-2) 7 has a data structure according to a network type model. To match the contents of the databases (DB-1 and DB-2) 7 with those of the databases (DB-1 and DB-2) 4 in the main center 2, the backup center 3a receives the transaction information from the interserver data association apparatus 1. A mirroring program 6 updates the databases (DB-1 and DB-2) 7 based on the received transaction information. An application program 8 is the program which allows the backup center 3a to take over the main business works when the main center 2 fails, and which has the same contents as the application program 5 in the main center 2.

In using this backup center 3a, a backup copy of the data written in each database (DB-1, DB-2) 4 in the main center 2 is taken and is then written in the associated database (DB-1, DB-2) 7. Then, the interserver data association apparatus 1 is connected between the main business server incorporated in the main center 2 and the main business server incorporated in the backup center 3a to start the operation of the main business server in the main center 2. When the main business server in the main center 2 starts and a transaction occurs, transaction information is output to the interserver data association apparatus 1. The transaction information obtained by the interserver data association apparatus is merged and grouped transaction by transaction and is finally stored in a distribution buffer 12a in a distribution unit 12 prepared for each database 7. It is understood from the data stored there which resource (database) 4 has been updated with what value. Accordingly, the mirroring program 6 in the backup center 3a updates each database 7 based on that information. In this case, if only "reference" is made in the main center 2, the transaction information (M1) based on this manipulation is not sent to the backup center 3a.

[Information System Server]

The information server 3b serves to build the results of the main business server in the main center 2 as an information system.

This information system server 3b has a database (DB-3) 10 which reflects the results of the main business server. The model (data structure) of the database (DB-3) 10 is a relational type. The information system server 3b has an application program 9 which reflects the transaction information, transmitted from the interserver data association apparatus 1, on the database (DB-3) 10, and an application program 11 which processes and utilizes the data stored in this database (DB-3) 10.

In using this information system server 3b, the logics of the mirroring program 9 are previously executed to initialize the database (DB-3) 10 based on the data written in the databases (DB-1 and DB-2) in the main center 2. Then, the interserver data association apparatus 1 is connected between the main business server of the main center 2 and the information server 3b to start the operation of the main business server in the main center 2. When the main business server in the main center 2 starts and a transaction occurs, transaction information is output to the interserver data association apparatus 1. The transaction information obtained by the interserver data association apparatus 1 is stored in a distribution buffer 12a in the distribution unit 12 prepared for the information system server 3b as in the case of the backup center 3a. It is understood from the data stored therein which item has been updated with what value. Accordingly, the mirroring program 9 in the information system server 3b updates each-database 10 based on that information.

[Batch Processing Server]

The batch processing server 3c serves to perform information processing, such as calling or sending direct mails to customers who have deposited a large amount of money, based on the results of the main business works done by the main center 2.

This batch processing server 3c reads from the distribution buffer 12a only the account number and the amount of a deposit from the transaction information about the general ledger sent to the interserver data association apparatus 1 from the main business server 2. A batch processing program 15 performs a batch process such as the preparation of a document 13 from the account number and the amount of the deposit. A database (DB-4) 14 holds information which has the account numbers associated with private information (addresses, names, telephone numbers, etc.) of individual customers.

The batch processing program 15 searches the database (DB-4) 14 to read out the private information of the customers based on the account numbers to which a deposit of more than a certain amount is deposited, and prepares the document 13 showing a list of the private information.

The structures of the above-described main center 2, backup center 3a, information system server 3b and batch processing server 3c, and the connection between those servers and the interserver data association apparatus 1 are the same in the descriptions of the second to fourth embodiments which will be given later.

<Interserver Data Association Apparatus>

[Internal Structure]

The internal structure of the interserver data association apparatus 1 used in the first embodiment will be described below. In the following description, the main business server in the main center 2 is called a "transmission server," and the main business server in the backup center 3a, the information system server 3b and the batch processing server 3c are collectively called "reception servers". It is assumed that as the number of "reception servers" which are connected to the interserver data association apparatus 1 is n, numbers "1" to "n" are given to the individual reception servers 3.

Figure 5:
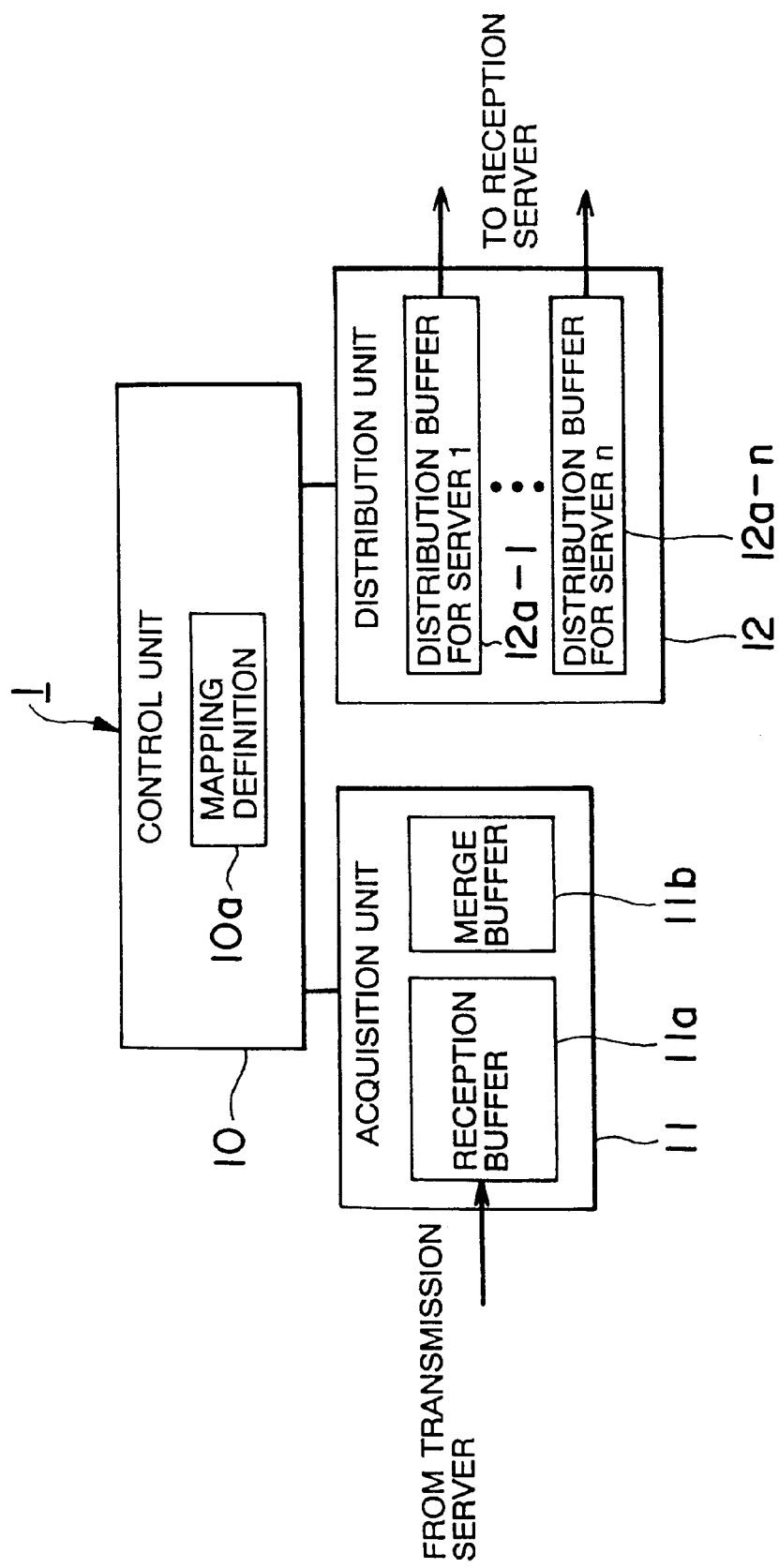
FIG. 5 is a block diagram showing the structure of an interserver data association apparatus according to the first embodiment of this invention.

As shown in FIG. 5, the interserver data association apparatus 1 comprises a control unit 10, an acquisition unit 11 as reception means, and a distribution unit 12 as identification means and distribution means. Both the acquisition unit 11 and the distribution unit 12 are connected to the control unit 10.

The acquisition unit 11 receives the transaction information sent from the transmission server and refers to a mapping definition 10a stored in the control unit 10 to group the transaction information, transaction by transaction and in the transaction order. The acquisition unit 11 has a reception buffer 11a and a merge buffer 11b and accomplishes the aforementioned functions by running a program.

The reception buffer 11a receives transaction information sent from the transmission server.

The transaction information is transferred to the merge buffer 11b from the reception buffer 11a. This merge buffer 11b has a plurality of slots, and stores transaction information having the same transaction identifier (Ti) for each slot. When every transaction information about the same transaction is written in any slot, i.e., when transaction information indicating the end of the transaction (R3) is written in the merge buffer 11b, the number of the associated slot is reported to the distribution unit 12.

The distribution unit 12 refers to the mapping definition 10a stored in the control unit 10 to read all the transaction information written in the slot of the merge buffer 116 informed by the acquisition unit 11 and sends the transaction information to each reception server. The distribution unit 12 has distribution buffers 12a associated in number with the reception servers connected to the interserver data association apparatus 1, and accomplishes the aforementioned functions by running a program.

The transaction information needed by an associated reception server is selected from the transaction information read from the acquisition unit 11 and written in the associated distribution buffer 12a. The distribution buffer 12a sends the stored transaction information to the associated transmission server at the timing requested by this associated reception server.

The control unit 10 controls the operations of the acquisition unit 11 and the distribution unit 12, and transfers transaction information between the acquisition unit 11 and distribution unit 12. This control unit 10 is a functional module which is accomplished by running programs. The control unit 10 has the mapping definition 10a which defines the condition for acquiring transaction information in the merge buffer 11b, the condition for distributing transaction information to each distribution buffer 12a, and the trigger condition for transmitting transaction information to each reception server from the distribution buffers 12a.

[Mapping Definition]

FIG. 6 shows the specific contents of the mapping definition 10a. The mapping definition 10a has two tables A and B. The table A defines a "resource identifier" for determining the type of transaction information (which transaction information should be acquired for which resource) that is obtained in the merge buffer 116, and defines to which reception server transaction information affixed with which resource identifier should be distributed. The table B defines reception servers as the distribution destinations and trigger conditions for distributing transaction information to the individual reception servers. In the example in FIG. 6, transaction information affixed with the resource identifiers "R1", "R2" and "R3" are acquired from the reception buffer 11a. The transaction information given the resource identifier "R1" and the transaction information given the resource identifier "R2" are distributed to the distribution buffer 12a-1 for the server 1, and every time ten pieces of transaction information are stored, the transaction information are transmitted to the server 1. The transaction information given the resource identifier "R2" and the transaction information given the resource identifier "R3" are distributed to the distribution buffer 12a-2 for the server 2, and the transaction information are transmitted to the server 2 at 5 o'clock every day. The transaction information given the resource identifier "R1" and the transaction information given the resource identifier "R3" are distributed to the distribution buffer 12a-3 for the server 3, and the transaction information are transmitted to the server 3 every hour.

[Acquisition Unit Algorithm]

Figure 7:
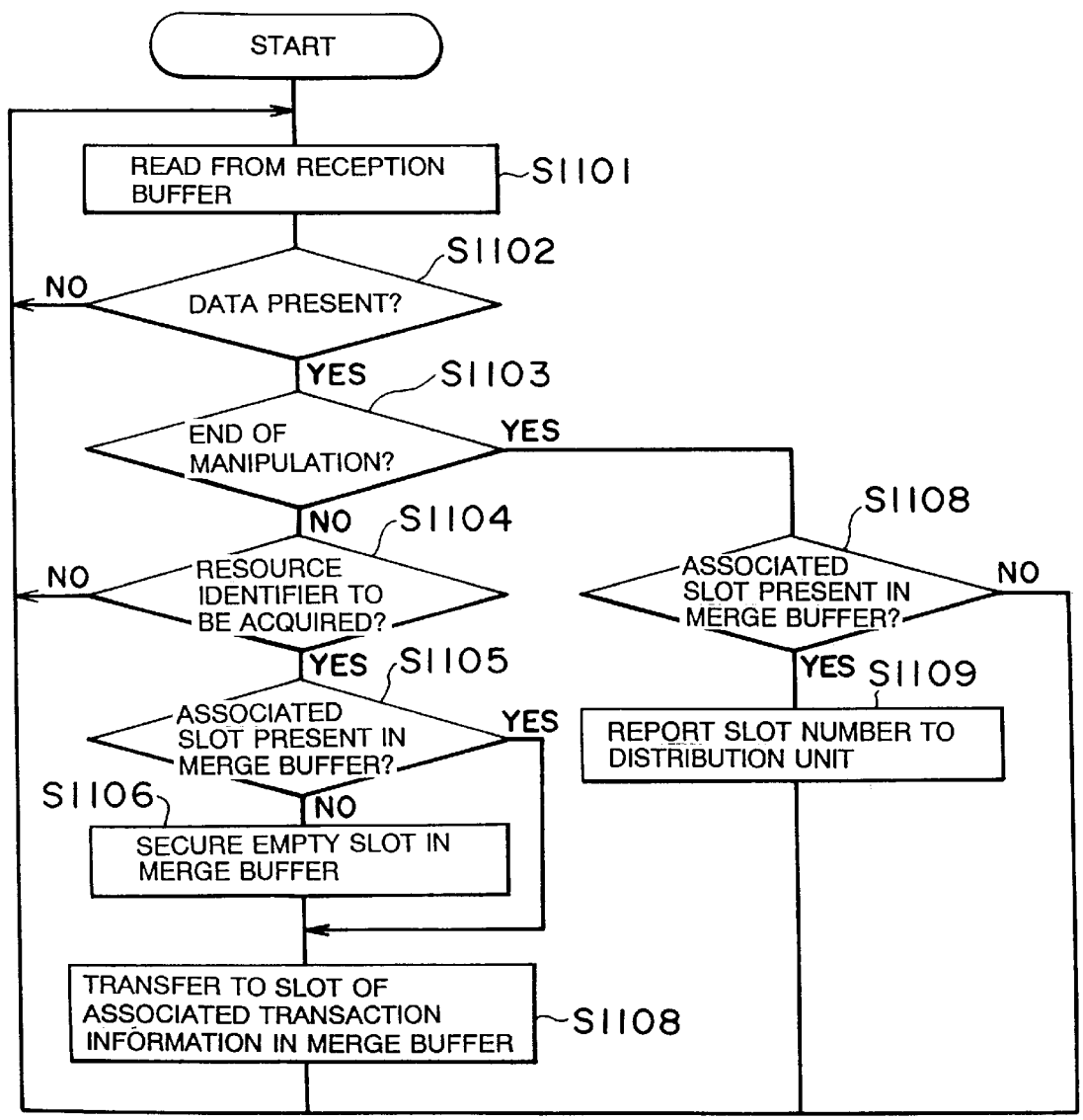
FIG. 7 is a flowchart illustrating a sequence of processes executed by an acquisition unit in FIG. 5.

FIG. 7 is a flowchart illustrating an algorithm executed by the acquisition unit 11. This flowchart starts when the interserver data association apparatus 1 is powered on. In step S1101, transaction information is read from the reception buffer 11a. In the next step S1102, it is determined if there is transaction information in the reception buffer 11a. When there is no transaction information, the flow returns to step S1101 and the above read and determination are repeated until transaction information is written in the reception buffer 11a. When transaction information exists, the flow proceeds to step S1103.

In step S1103, it is determined if the manipulation (Mj) item of the read transaction information is M3 (end of transaction). If it is not the end of the transaction, it is determined in the next step S1104 whether the resource identifier (Rk) of this transaction information corresponds to what is defined in the mapping definition 10a. This step filters the item to be acquired. When the resource identifier (Rk) does not correspond to what is defined in the mapping definition 10a, it is considered that there is no reception server requiring the transaction information of this resource and this transaction information will be abandoned. The flow then returns to step S1101.

When the resource identifier (Rk) corresponds to what is defined in the mapping definition 10a, on the other hand, it is determined in step S1105 whether the merge buffer 11b has a slot storing transaction information having the same transaction identifier (Ti) as the transaction identifier (Ti) of the transaction information in question. When there is such a slot, the flow proceeds to step S1107. When there is no such slot (there is no such slot in the initial state), an empty slot is secured in the merge buffer 11b in step S1106 and this empty slot is treated as the slot corresponding to the transaction identifier (Ti) of that transaction information. The flow then goes to step S1107. In step S1107, the transaction information is transferred to the slot of the transaction identifier (Ti) in the merge buffer 11b. Thereafter, the flow returns to step S1101 to execute the process on the next transaction information.

When the manipulation (Mi) of the transaction information is M3 (end of the transaction), the processing proceeds to step S1108 from step S1103. In step S1108, it is determined whether the merge buffer 11b has a slot corresponding to the transaction identifier (Ti) of this transaction information. As there is such a corresponding slot, the slot number of this slot is reported to the distribution unit 12 in step S1109. When only transaction information of M3 (end of the transaction) with respect to the transaction has been transmitted, on the other hand, there is no data to be transferred to the distribution unit 12, so that step S1109 will be skipped. In any case, the processing returns to step S1101 to execute the process on the next transaction information.

[Distribution Unit Algorithm]

Figure 8:
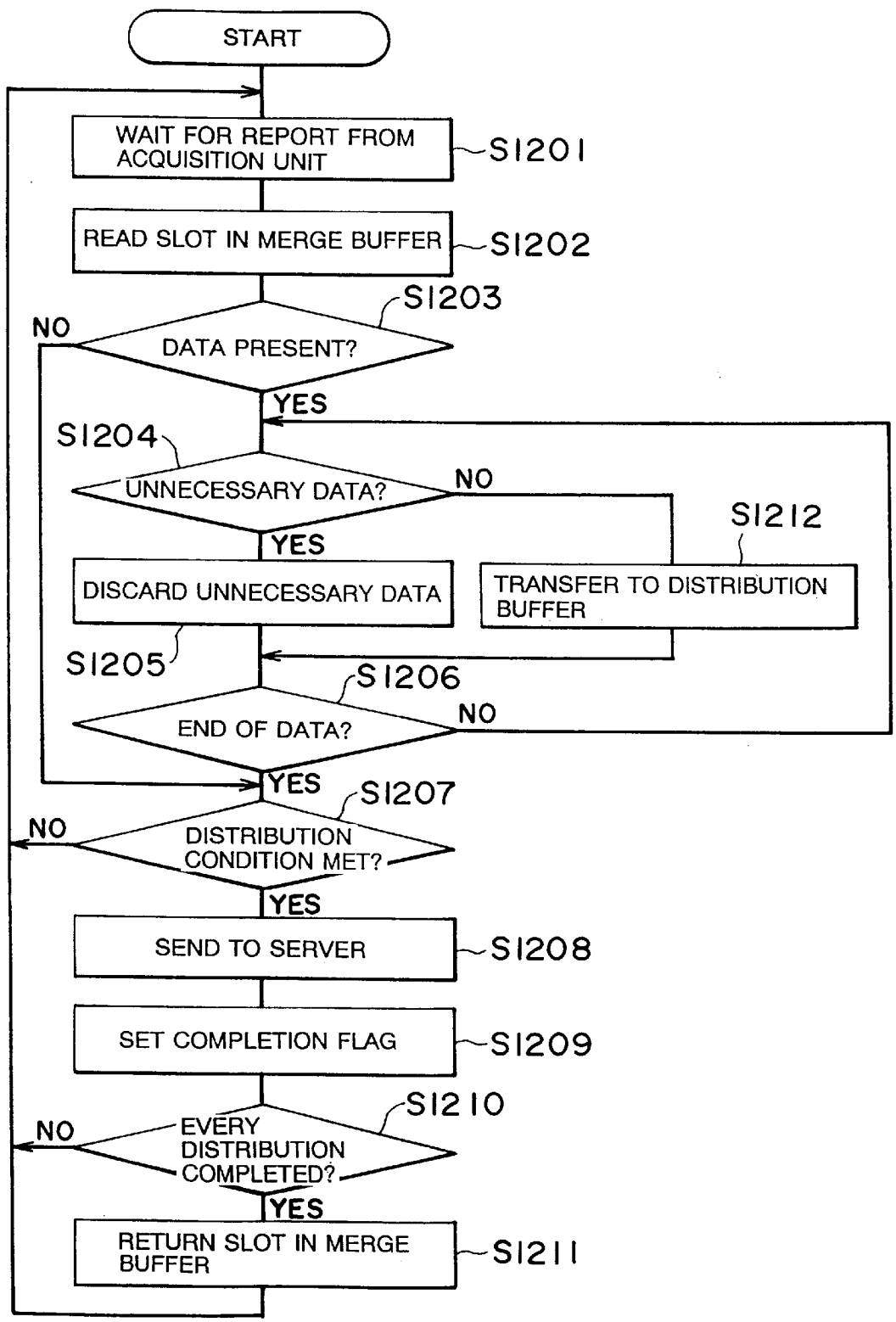
FIG. 8 is a flowchart illustrating a sequence of processes executed by a distribution unit in FIG. 5.

FIG. 8 is a flowchart illustrating an algorithm executed by the distribution unit 12. The distribution unit 12 executes a plurality of algorithms in parallel for each distribution buffer 12a.

This flowchart starts when the interserver data association apparatus 1 is powered on. In step S1201, the distribution unit 12 waits for the report from the acquisition unit 11. In the next step S1202, based on the slot number informed by the acquisition unit 11, the distribution unit 12 reads transaction information written in the associated slot in the merge buffer 11b.

It is then determined in step S1203 if there is transaction information in this associated slot. When there is no transaction information, the distribution condition is checked in step S1207.

When there is transaction information, on the other hand, the flow proceeds to the loop of steps S1204 to S1206. This loop is executed step by step for each piece of transaction information read from the associated slot in the merge buffer 11b.

It is determined in step S1204 whether the transaction information read in step S1202 is unnecessary for the distribution buffer 12a targeted in this flowchart. The decision is made by checking if the resource identifier (Rk) of the transaction information indicates the server corresponding to this distribution buffer 12a as the destination in the table A of the mapping definition 10a.

If the transaction information is unnecessary, this transaction information is discarded with respect to the process in question in step S1205 (not discarded with respect to the processes for the other distribution buffers 12a). If the transaction information is necessary, it is transferred to the target distribution buffer 12a in step S1212.

In any case, the flow goes to step S1206 to check if there remains unprocessed transaction information in the associated slot in the merge buffer 11b. If unprocessed transaction information remains, the flow returns to step S1204 to execute the loop process on the next transaction information.

When it is determined in step S1206 that no unprocessed transaction information is remaining, the flow advances to step S1207.

In step S1207, it is checked if the distribution condition is met. This check is made by referring to the trigger column in the table B of the mapping definition 10a for the server corresponding to the target distribution buffer 12a.

When the distribution condition is not met, the flow returns to step S1201. When the distribution condition is satisfactory, on the other hand, the transaction information stored in the target distribution buffer 12a is transmitted to the associated server in step S1208.

Figures 9, 10:
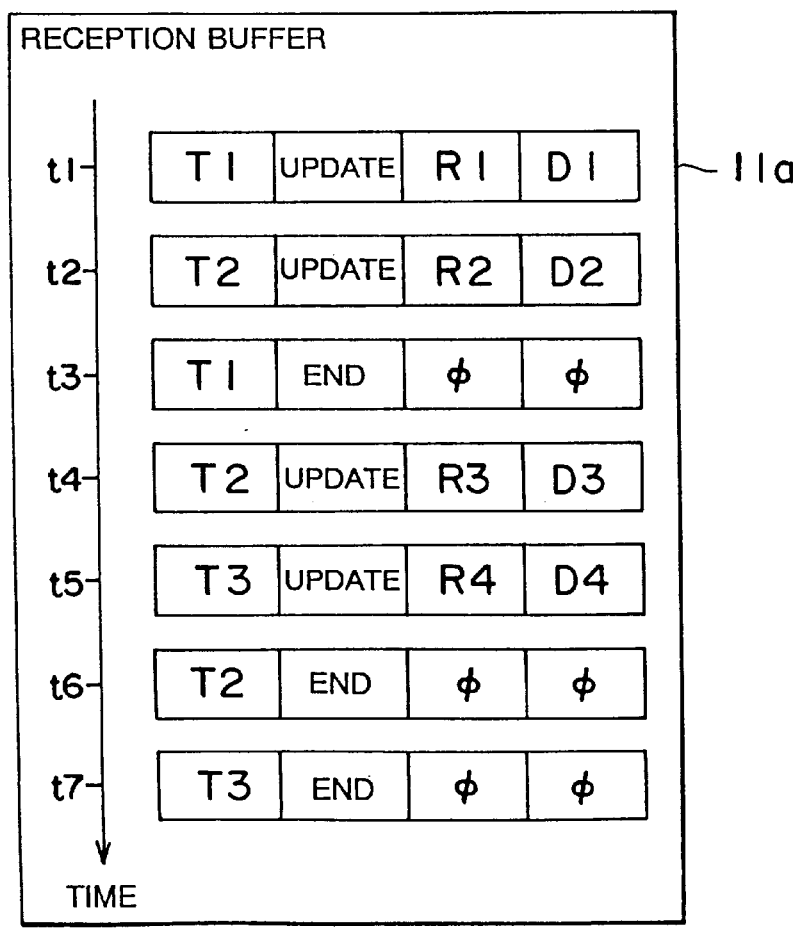
FIG. 9 is an explanatory diagram of complete indication areas.
FIG. 10 is a diagram showing an example of what is received by a reception buffer in FIG. 5.

In the subsequent step S1209, a complete flag is set in the complete indication areas as shown in FIG. 9. There are a plurality of complete indication areas provided in the distribution unit 12 in association with the individual slots in the merge buffer 11b.

It is then checked in the complete indication areas in step S1210 if distribution for every buffer has been completed. With regard to the complete indication area which indicates that distribution for every buffer has been completed, the associated slot in the merge buffer 11b is returned in step S1211. With regard to the complete indication area which indicates that distribution for every buffer has not been completed, step S1211 is skipped. In any case, the flow then returns to S1201.

<Specific Example of Processing>

A specific example of the processing in the above-described algorithm will be discussed below. The following description will be given on the premise that transaction information have been transmitted from the transmission server consecutively in the order as shown in FIG. 4. It is assumed that the contents of the mapping definition 10a are as illustrated in FIG. 6. It is also assumed that the processes in FIGS. 7 and 8 are executed at a sufficiently high speed and the time lag needed for the data transfer between the individual buffers is negligible.

In this case, transaction information are sequentially written in the reception buffer 11a at the timings shown in FIG. 10.

Figure 11:
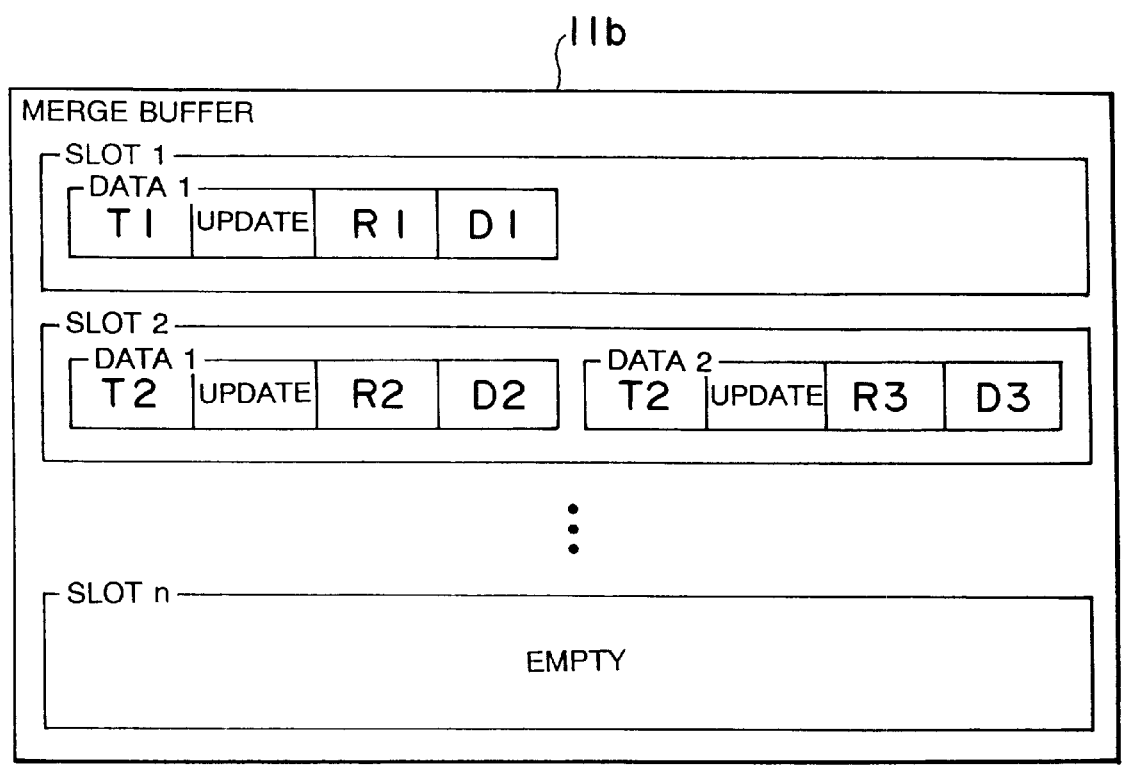
FIG. 11 is a diagram showing an example of what is received by a merge buffer in FIG. 5.

Since the acquisition unit 11 is performing the process in FIG. 7 at the same time as the writing of the transaction information, each transaction information is written in the merge buffer 11b in the form shown in FIG. 11. FIG. 11 shows the status at time t7. The slot 1 in FIG. 11 corresponds to the transaction T1, and the slot 2 corresponds to the transaction T2. As the transactions only up to T3 have occurred at the point of time t7, the slot n (n>3) is empty. Since the resource R4 is not defined in the mapping definition 10a, the transaction information about the resource (R4) at time t5 is discarded (step S1104). As a result of executing the process illustrated in FIG. 7, the number of the slot 1 is reported to the distribution unit 12 at time t3 and the number of the slot 2 is reported to the distribution unit 12 at time t6 (step S1109).

Figure 12:
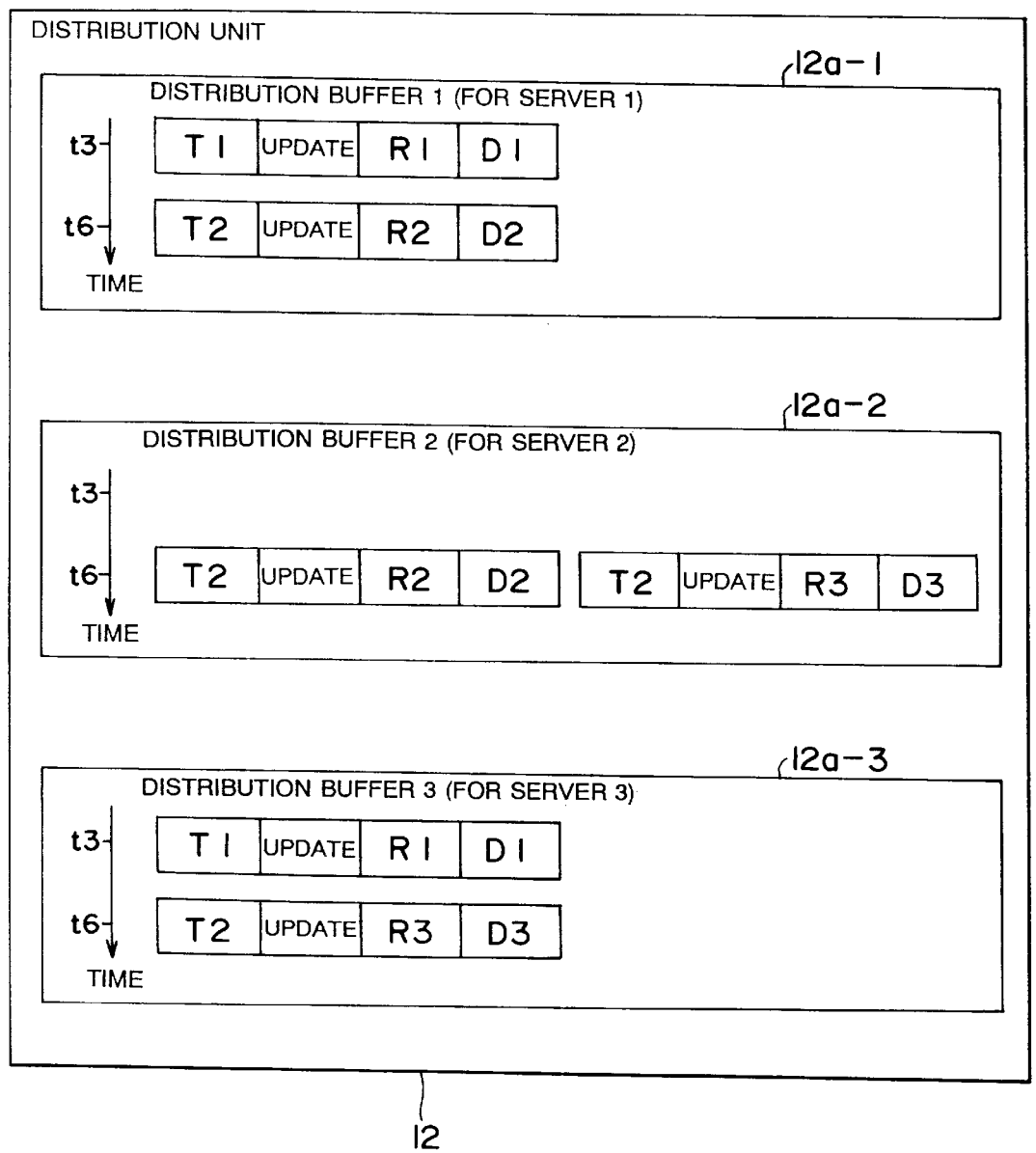
FIG. 12 is a diagram showing an example of what is received by each distribution buffer in FIG. 5.

The process in FIG. 8 is executed in parallel in the distribution unit 12 in association with the individual distribution buffers 12a. As illustrated in FIG. 12, therefore, the distribution unit 12 transfers data 1 (R1) in the slot 1 to the distribution buffer 12a-1 for the server 1 and the distribution buffer 12a-3 for the server 3 in accordance with the mapping definition 10a when informed of the number of the slot 1 at time t3 (step S1212). Likewise, when informed of the number of the slot 2 at time t6, the distribution unit 12 transfers data 1 (R2) in the slot 2 to the distribution buffer 12a-1 for the server 1 and the distribution buffer 12a-2 for the server 2 and transfers data 2 (R3) in the slot 2 to the distribution buffer 12a-2 for the server 2 and the distribution buffer 12a-3 for the server 3 (step S1212).

Thereafter, transaction information stored in the distribution buffer 12a-1 for the server 1 are transmitted to the server 1 every time ten pieces of the transaction information are collected therein, transaction information stored in the distribution buffer 12a-2 for the server 2 are transmitted to the server 2 at 5 o'clock every day, and transaction information stored in the distribution buffer 12a-3 for the server 3 are transmitted to the server 3 every hour (step S1208).

<Advantage of Embodiment>

According to this embodiment, as described above, the transaction information transmitted from one transmission server 2 can be sent to a plurality of reception servers 3a–3c. What is more, only the transaction information about the resource (Rk) requested by each reception server 3a, 3b or 3c can be selected and can be transferred to the associated reception server 3a, 3b or 3c only when the timing (trigger) condition requested by this reception server is satisfied.

The reception servers 3a–3c having received the transaction information can have the following advantages. If information transfer from the distribution unit 12 is accomplished as needed using the fast communications line, the backup center 3a can match the contents of the databases (DB-1 and DB-2) 7 in the backup center 3a with those of the databases (DB-1 and DB-2) 4 in the main center 2 in a sufficiently short period of time. When the main center 2 fails, therefore, the backup center 3a can promptly resume the services by switching.

Since the information system server 3b can control the running of the mirroring program 9 in FIG. 2 by using the trigger function of the interserver data association apparatus 1, the mirror timing can be controlled as needed. That is, information can be mirrored instantaneously or once a day in accordance with the frequency of use and the characteristics of the information databases. Further, mirroring of the databases is possible regardless of the database models (e.g., the network type and relational type) of the main business server 2. Even if the databases (DB-1 and DB-2) 4 of the main business server 2 are of a network type and the database (DB-3) of the information server 3b is of a relational type, the difference between the models can be nullified completely by previously associating the definitions of the items of the transaction information for one database with those of another database. The main business server and the information system server 3b can both build up the works in the models they want to use themselves.

The batch processing server 3c can perform a batch process in parallel to the main business server without waiting for the completion of any business work, by utilizing the interserver data association apparatus 1 (this is called a current batch). Further, the batch processing server 3c can work itself without implementing a logic in the application program 5 for the main business server.

Second Embodiment

The buffers 11a, 11b and 12a in the first embodiment are each constituted of a volatile memory. When the interserver data association apparatus 1 is deactivated, therefore, data described in the buffers 11a, 11b and 12a cannot be held. When the operational time zone of the transmission server 2 and the interserver data association apparatus 1 differs from the operational time zones of the reception servers 3a–3c, therefore, transaction information cannot be distributed and the operational independency between the former server 2 and apparatus 1 and the latter reception servers 3a–3c cannot be secured. To overcome this shortcoming, a storage section 23 incorporating a non-volatile memory (hard disk) 23a intervenes between an acquisition unit 21 and a distribution unit 22 in the second embodiment.

Besides, the mapping definition 10a is shared by the acquisition unit 11 and distribution unit 12 in the first embodiment. To correct the mapping definition to add a reception server 3 or to alter data requested by each server, therefore, interserver data association apparatus 1 should be deactivated entirely. That is, alteration of one reception server 3 influences the overall system. To overcome this problem, the mapping definition 10a in the first embodiment is separated to an acquisition definition 20a used by the acquisition unit 21 and a distribution definition 20b used by the distribution unit 22 in the second embodiment.

<Connection With Servers>

The structures of the above-described main center 2, backup center 3a, information system server 3b and batch processing server 3c, and the connection between those servers 2, 3a–3c and the interserver data association apparatus 1 in the second embodiment are quite the same as those of the first embodiment. Therefore, their descriptions will be omitted while FIGS. 2 through 4 referred to.

<Interserver Data Association Apparatus>

[Internal Structure]

The internal structure of the interserver data association apparatus 1 used in the second embodiment will be described below. In the following description, the main business server in the main center 2 is called a "transmission server", and the main business server in the backup center 3a, the information server 3b and the batch processing server 3c are collectively called "reception servers". It is assumed that as the number of "reception servers" which are connected to the interserver data association apparatus 1 is n, numbers "1" to "n" are given to the individual reception servers 3.

Figure 13:
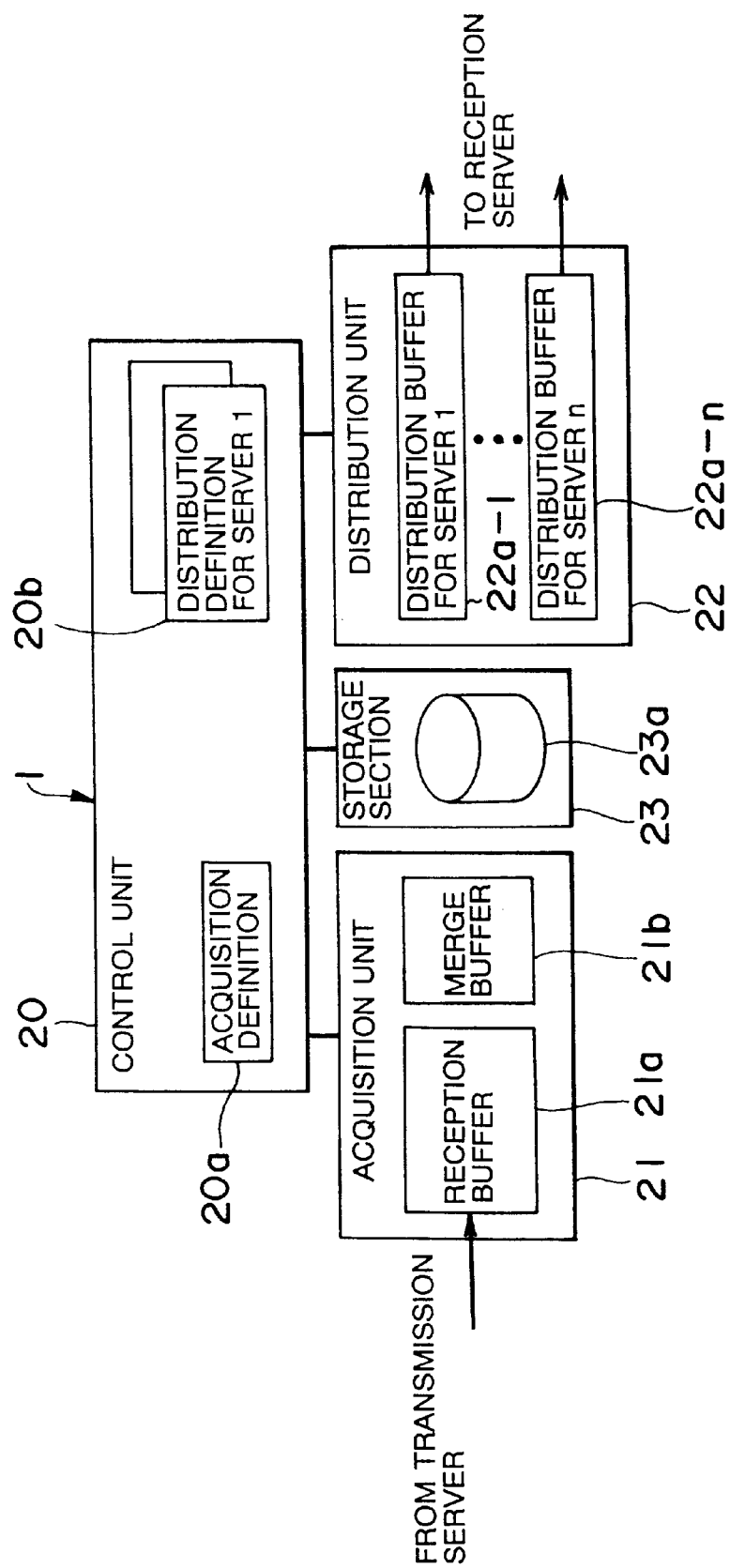
FIG. 13 is a block diagram showing the structure of an interserver data association apparatus according to a second embodiment of this invention.

As shown in FIG. 13, the interserver data association apparatus 1 comprises a control unit 20, an acquisition unit 21 as reception means, a storage section 23, and a distribution unit 22 as identification means and distribution means connected to the control unit 20 respectively. The acquisition unit 21 receives the transaction information sent from the transmission server 2 and refers to the acquisition definition 20a stored in the control unit 20 to group the transaction information, transaction by transaction and in the transaction order. The acquisition unit 21 has a reception buffer 21a and a merge buffer 21b and accomplishes the aforementioned functions by running a program.

The reception buffer 21a receives transaction information sent from the transmission server 2.

The transaction information is transferred to the merge buffer 21b from the reception buffer 21a. This merge buffer 21b has a plurality of slots, and stores transaction information having the same transaction identifier (Ti) for each slot. When every transaction information about the same transaction is written in any slot, i.e., when transaction information indicating the end of the transaction (R3) is written in the merge buffer 21b, all the transaction information written in the associated slot are transferred to the storage section 23.

The storage section 23 has the non-volatile medium 23a. When receiving the transaction information from the merge buffer 21b, the storage section 23 writes this transaction information in a non-volatile memory (hard disk) 23a to make it non-volatile, and reports the number of a record in the non-volatile memory (hard disk) 23a where the transaction information has been written, to the distribution unit 22. The storage section 23 accomplishes the aforementioned functions by running a program.

The transaction information is transferred to the non-volatile medium 23a from the merge buffer 21b. This non-volatile medium 23a has a plurality of records associated with the slots in the merge buffer 21b. The transaction information is transferred between the slots in the merge buffer 21b and the associated records in the non-volatile medium 23a.

The distribution unit 22 reads all the transaction information written in the record informed by the storage section 23, and sends only the necessary information from among the read transaction information to the individual reception servers 3a–3c by referring to the distribution definition 20b stored in the control unit 20. The distribution unit 22 has distribution buffers 22a associated in number with the reception servers 3a–3c connected to the interserver data association apparatus 1, and accomplishes the aforementioned functions by running a program.

The transaction information needed by an associated reception server 3a, 3b or 3c is selected from the transaction information transferred from the storage section 23, and written in the associated distribution buffer 22a. The distribution buffer 22a sends the stored transaction information to the associated transmission server 3a, 3b or 3c at the timing requested by this associated reception server.

The control unit 20 controls the operations of the acquisition unit 21, the storage section 23 and the distribution unit 22, and transfers transaction information among the acquisition unit 21, the storage section 23 and distribution unit 22. This control unit 20 is a functional module which is accomplished by running programs. The control unit 20 has the acquisition definition 20a which defines the condition for acquiring transaction information in the merge buffer 21b, and the distribution definitions 20b which define the conditions for distributing transaction information to the associated distribution buffers 22a, and the trigger conditions for transmitting transaction information to the associated reception servers 3a–3c from the distribution buffers 22a. The distribution definitions 20b equal in number to the distribution buffers 22a are provided in association with the distribution buffers 22a.

[Acquisition Definition]

Figure 14:
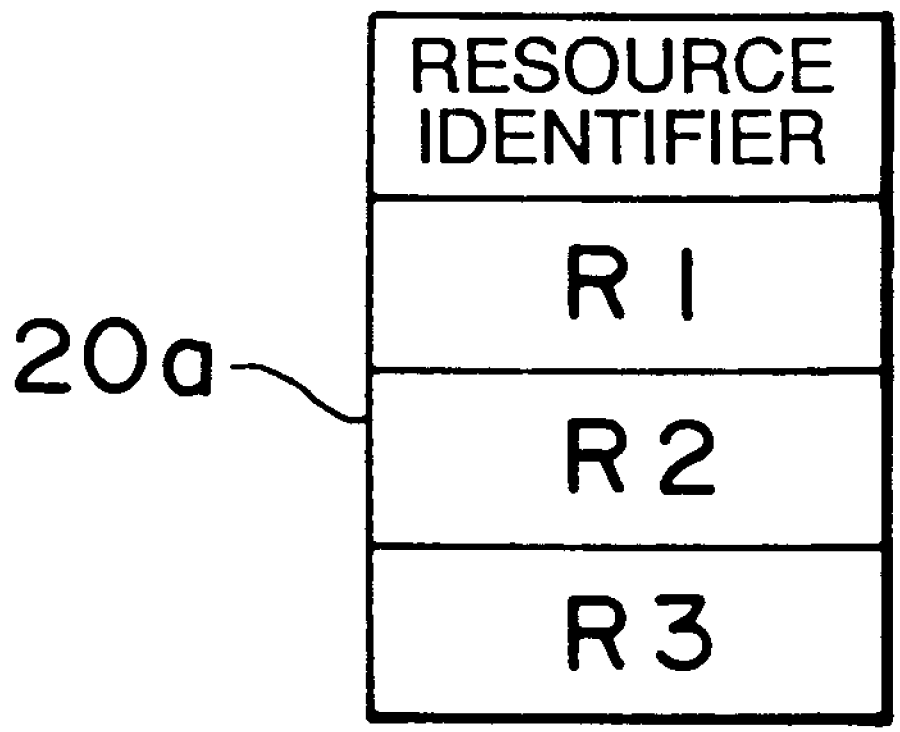
FIG. 14 is a diagram showing the structure of an acquisition definition in the second embodiment of this invention.

FIG. 14 shows the specific contents of the acquisition definition 20a. The acquisition definition 20a consists of a single table. This table 20a defines a "resource identifier" for determining the type of transaction information (indicating for which resource transaction information should be acquired) that is obtained in the merge buffer 21b. In the example in FIG. 14, it is defined that transaction information affixed with the resource identifiers "R1,", "R2" and "R3" are acquired by the merge buffer 21b.

[Distribution Definition]

FIG. 15 shows the specific contents of the distribution definition 20b. The distribution definition 20b consists of a single table. This table 20b defines a "resource identifier" for determining the type of transaction information (indicating for which resource transaction information should be distributed) that is distributed to the associated distribution buffer 22a and the "trigger conditions" for determining the timings of distributing transaction information to the reception servers 3a–3c as the destinations. In the example in FIG. 15, it is defined that transaction information affixed with the resource identifier "R1" and transaction information affixed with the resource identifier "R2" are distributed to the distribution buffer 22a-1 for the server 1, and that every time ten pieces of transaction information are stored, the transaction information are transmitted to the server 1. It is also defined that the transaction information given the resource identifier "R2" and the transaction information given the resource identifier "R3" are distributed to the distribution buffer 22a-2 for the server 2, and that the transaction information are transmitted to the server 2 at 5 o'clock every day. It is further defined that the transaction information given the resource identifier "R1" and the transaction information given the resource identifier "R3" are distributed to the distribution buffer 22a-3 for the server 3, and that the transaction information are transmitted to the server 3 every hour.

Figure 16:
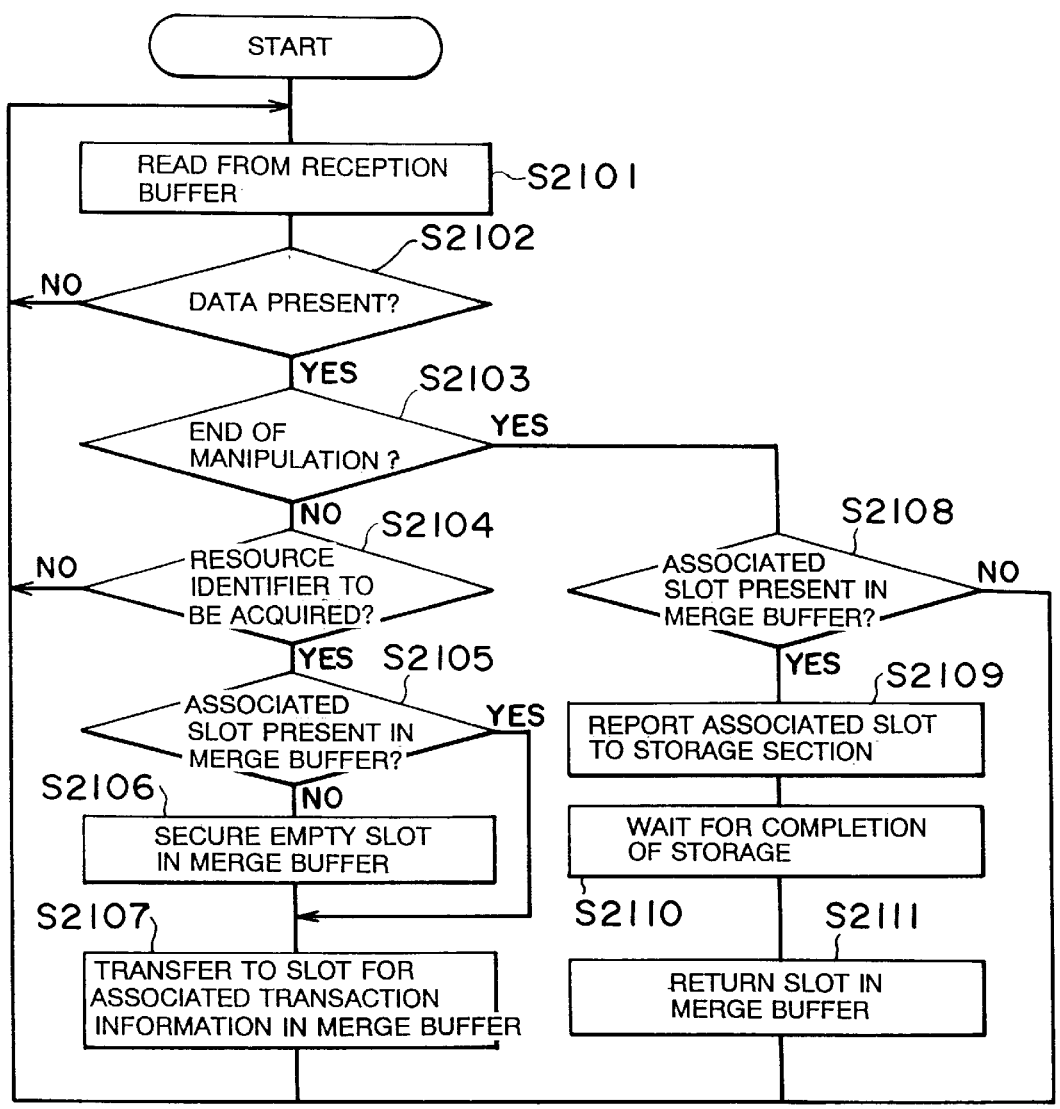
FIG. 16 is a flowchart illustrating a sequence of processes executed by an acquisition unit in FIG. 13.

[Acquisition Unit Algorithm] FIG. 16 is a flowchart illustrating an algorithm executed by the acquisition unit 21. This flowchart starts when the interserver data association apparatus 1 is powered on. In step S2101, transaction information is read from the reception buffer 21a. In the next step S2102, it is determined if there is transaction information in the reception buffer 21a. When there is no transaction information, the flow returns to step S2101 and the above read and determination are repeated until transaction information is written in the reception buffer 21a. When transaction information exists, the flow proceeds to step S2103.

In step S2103, it is determined if the manipulation (Mj) item of the read transaction information is M3 (end of transaction). If it is not the end of the transaction, it is determined in the next step S2104 whether the resource identifier (Rk) of this transaction information corresponds to what is defined in the acquisition definition 20a. This step filters the item to be acquired. When the resource identifier (Rk) does not correspond to what is defined in the acquisition definition 20a, it is considered that there is no reception server 3 requiring the transaction information of this resource and this transaction information will be abandoned. The flow then returns to step S2101.

When the resource identifier (Rk) corresponds to what is defined in the acquisition definition 20a, on the other hand, it is determined in step S2105 whether the merge buffer 21b has a slot storing transaction information having the same transaction identifier (Ti) as the transaction identifier (Ti) of the transaction information in question. When there is such a slot, the flow proceeds to step S2107. When there is no such slot (there is no such slot in the initial state), an empty slot is secured in the merge buffer 21b in step S2106 and this empty slot is treated as the slot corresponding to the transaction identifier (Ti) of that transaction information. The flow then goes to step S2107.

In step S2107, the transaction information is transferred to the slot of the transaction identifier (Ti) in the merge buffer 21b. Thereafter, the flow returns to step S2101 to execute the process on the next transaction information.

When the manipulation (Mi) of the transaction information is M3 (end of the transaction), the processing proceeds to step S2108 from step S2103. In step S2108, it is determined whether the merge buffer 21b has a slot corresponding to the transaction identifier (Ti) of this transaction information. As there is such a corresponding slot, the slot number of this slot is reported to the storage section 23. Then, the acquisition unit 21 waits for the storage section 23 to complete the storage in accordance with the reported slot number in step S2110. When the storage is complete, the slot in the merge buffer 21b is returned in step S2111 (this slot is emptied to return to the initial state).

When it is found in step S2108 that only transaction information of M3 (end of the transaction) with respect to the transaction has been transmitted, on the other hand, there is no associated slot in the merge buffer 21b so that steps S2109 to S2111 will be skipped.

In any case, the processing returns to step S2101 to execute the process on the next transaction information.

[Storage Section Algorithm]

Figure 17:
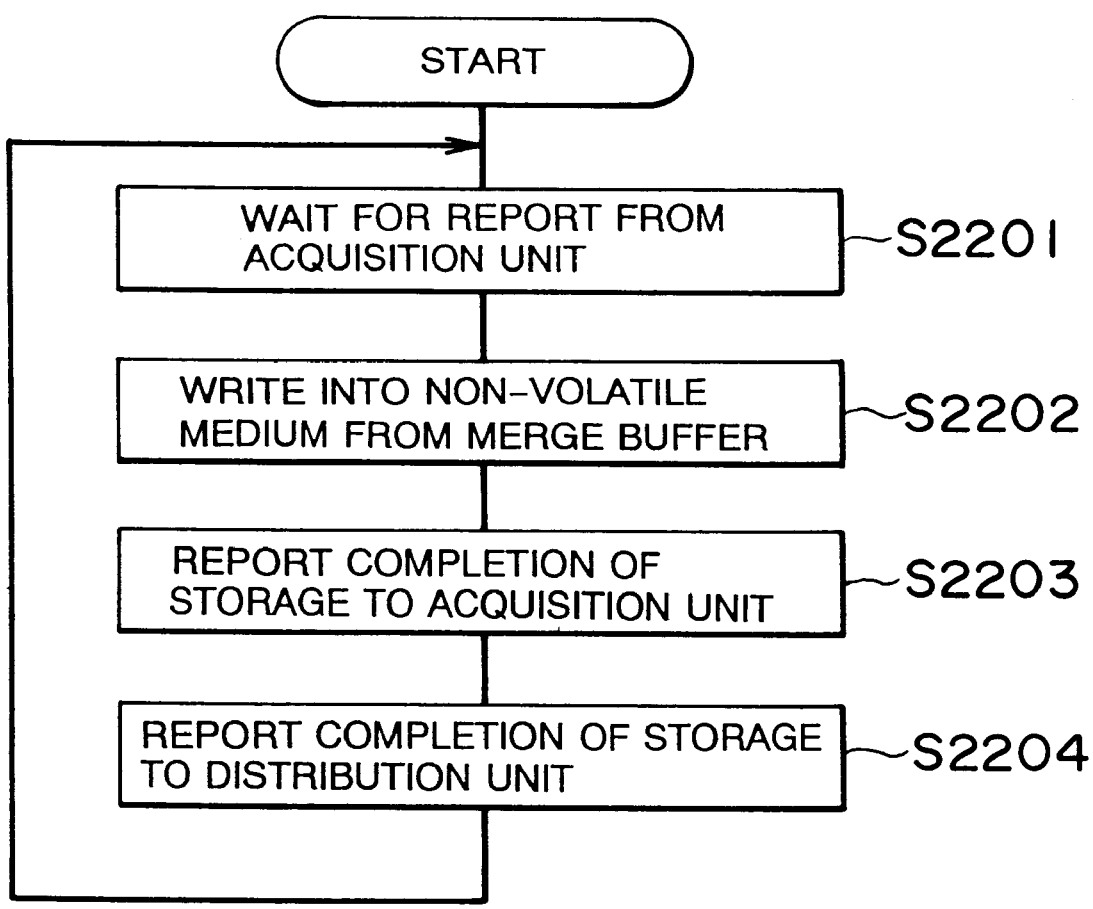
FIG. 17 is a flowchart illustrating a sequence of processes executed by a storage section in FIG. 13.

FIG. 17 is a flowchart illustrating an algorithm executed by the storage section 23. This flowchart starts when the interserver data association apparatus 1 is powered on.

In step S2201, the storage section 23 waits for the reporting of the slot number (step S2109) from the acquisition unit 21. When a slot number has been reported, the flow proceeds to step S2202.

In this step S2202, the contents of the informed slot in the merge buffer 21b are written in the non-volatile medium 23a. At the time this writing is carried out, the storage section 23 prepares a record associated with this slot in the non-volatile medium 23a. When the writing is completed, the flow goes to step S2203.

In this step S2203, the storage section 23 reports the completion of the storage to the acquisition unit 21. In the next step S2204, the storage section 23 reports the record number and the completion of the storage to the distribution unit 22. After those processes are finished, the flow returns to step S2201.

[Distribution Unit Algorithm]

Figure 18:
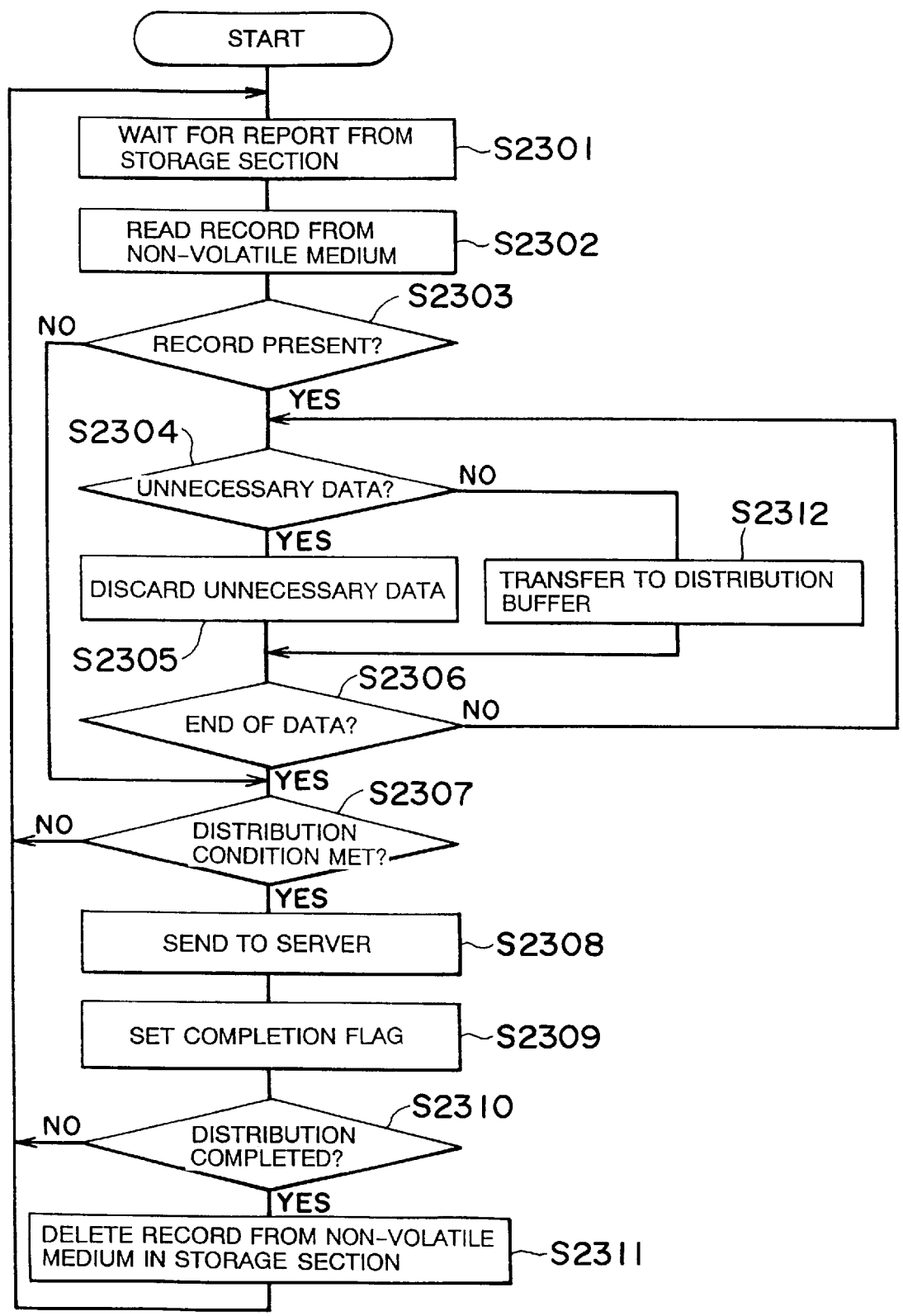
FIG. 18 is a flowchart illustrating a sequence of processes executed by a distribution unit in FIG. 13.

FIG. 18 is a flowchart illustrating an algorithm executed by the distribution unit 22. The distribution unit 22 executes a plurality of algorithms in parallel for each distribution buffer 22a.

This flowchart starts when the interserver data association apparatus 1 is powered on. In step S2301, the distribution unit 22 waits for the report of the completion of the storage from the storage section 23 in step S2301. In the next step S2302, based on the record number informed by the storage section 23, the distribution unit 22 reads associated record in the non-volatile medium 23a and reads out the transaction information written in this record.

It is then determined in step S2303 if there is transaction information in this associated record. When there is no transaction information, the distribution condition is heck ed in step S2307.

When there is transaction information, on the other hand, the flow proceeds to the loop of steps S2304 to S2306. This loop is executed step by step for each piece of transaction information read from the associated record in the non-volatile medium 23a.

It is determined in step S2304 whether the transaction information read in step S2302 is unnecessary for the distribution buffer 22a targeted in this flowchart. The decision is made by checking if the resource identifier (Rk) of the transaction information is defined in the associated distribution definition 20b.

If the transaction information is unnecessary, this transaction information is discarded with respect to the process in question in step S2305 (not discarded with respect to the processes for the other distribution buffers 22a). If the transaction information is necessary, it is transferred to the target distribution buffer 22a in step S2312.

In any case, the flow goes to step S2306 to check if there remains unprocessed transaction information in the associated record in the non-volatile medium 23a. If unprocessed transaction information remains, the flow returns to step S2304 to execute the loop process on the next transaction information.

When it is determined in step S2306 that no unprocessed transaction information is remaining, the flow advances to step S2307.

In step S2307, it is checked if the distribution condition is met. This check is made by referring to the trigger condition in the associated distribution definition 20b.

When the distribution condition is not met, the flow returns to step S2301. When the distribution condition is satisfactory, on the other hand, the transaction information stored in the target distribution buffer 22a is transmitted to the associated server in step S2308.

In the subsequent step S2309, a complete flag is set in the complete indication areas as shown in FIG. 9. There are a plurality of complete indication areas provided in the distribution unit 22 in association with the individual records in the non-volatile medium 23a.

It is then checked in step S2310 if distribution for every server has been completed in the complete indication areas. With regard to the complete indication area which indicates that distribution for every server has been completed, the associated record in the non-volatile medium 23a is returned in step S2311. With regard to the complete indication area which indicates that every distribution for every server has not been completed, step S2311 is skipped. In any case, the flow then returns to S2301.

<Specific Example of Processing>

A specific example of the processing in the above-described algorithm will be discussed below. The following description will be given on the premise that transaction information have been transmitted from the transmission server consecutively in the order as shown in FIG. 4. It is assumed that the contents of the acquisition definition 20a are as illustrated in FIG. 14 and the contents of the distribution definition 20b are as illustrated in FIG. 15. It is also assumed that the processes in FIGS. 16 through 18 are executed at a sufficiently high speed and the time lag needed for the data transfer among the individual buffers and the non-volatile medium 23a is negligible.

Figure 19:
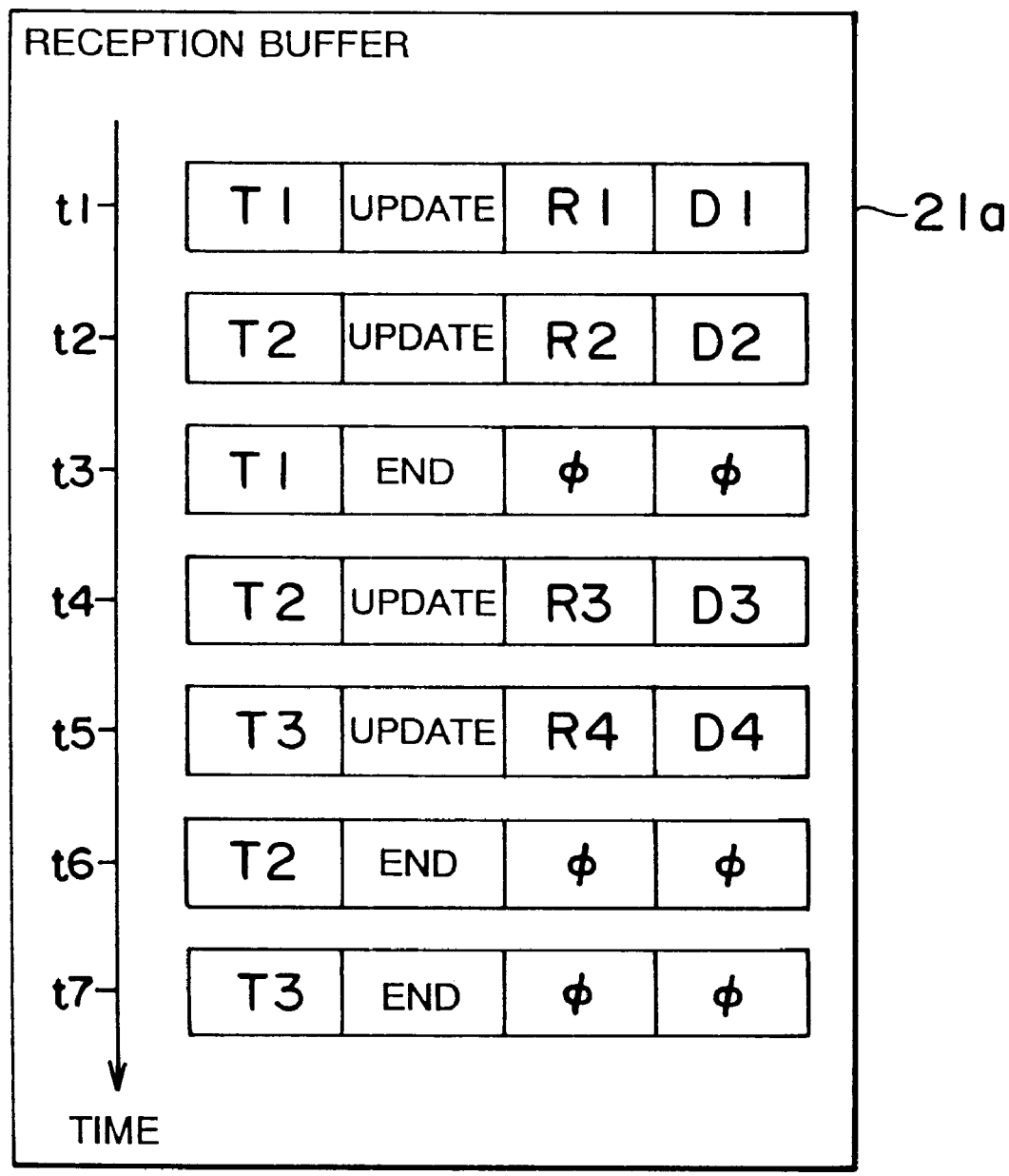
FIG. 19 is a diagram showing an example of what is received by a reception buffer in FIG. 13.

In this case, transaction information are sequentially written in the reception buffer 21a at the timings shown in FIG. 19.

Figure 20:
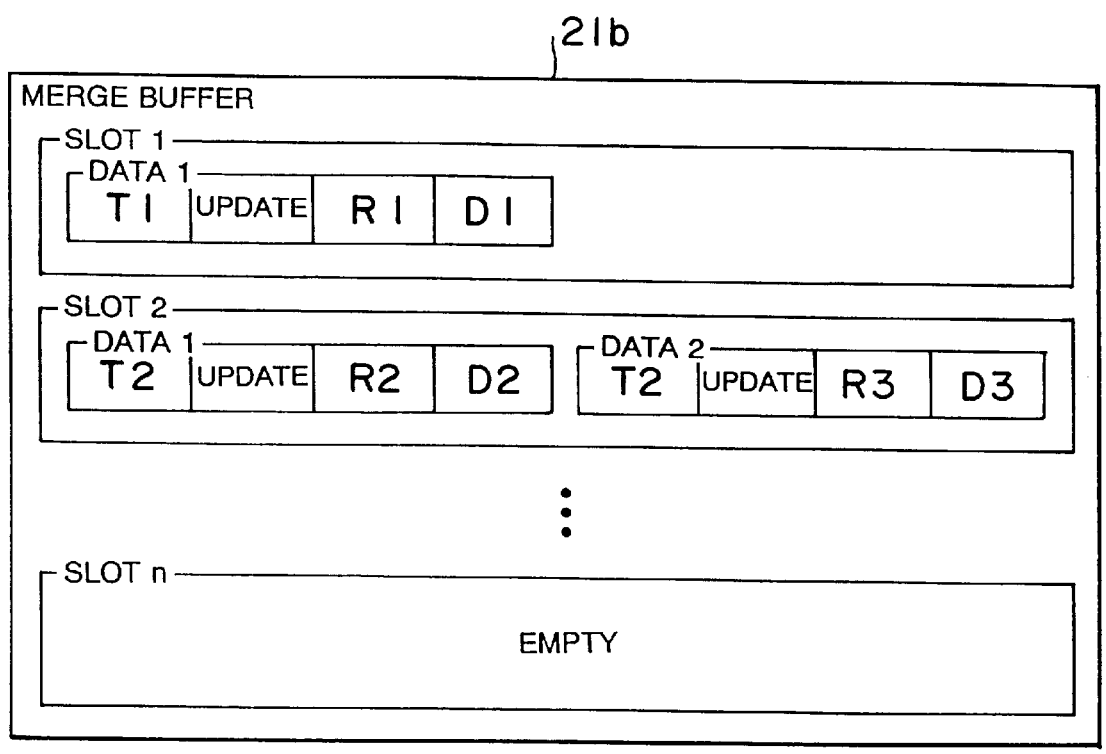
FIG. 20 is a diagram showing an example of what is received by a merge buffer in FIG. 13.

Since the acquisition unit 21 is performing the process in FIG. 16 at the same time as the writing of the transaction information, each transaction information is written in the merge buffer 21b in the form shown in FIG. 20. FIG. 20 shows the status at time t7. The slot 1 in FIG. 20 corresponds to the transaction T1, and the slot 2 corresponds to the transaction T2. As the transactions only up to T3 have occurred at the point of time t7, the slot n (n>3) is empty. Since the resource R4 is not defined in the acquisition definition 20a, the transaction information about the resource (R4) at time t5 is discarded (step S2104).

As a result of executing the process illustrated in FIGS. 16 and 17, the transaction information stored in the slot 1 is transferred to the storage section 23 at time t3 and the transaction information stored in the slot 2 is transferred to the storage section 23 at time t6 (steps S2109 and S2202).

Figure 21:
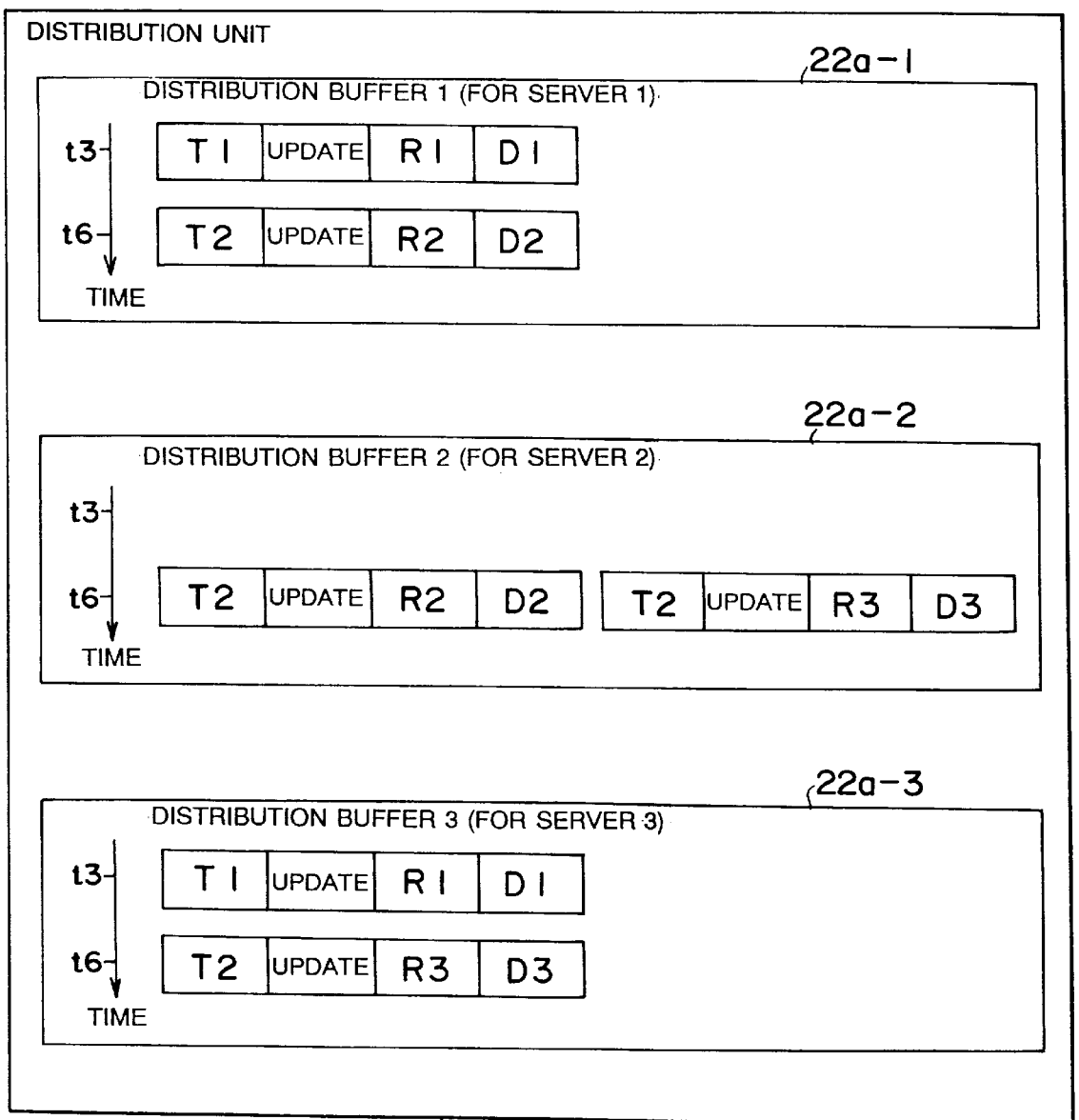
FIG. 21 is a diagram showing an example of what is received by each distribution buffer in FIG. 13.

The process in FIG. 18 is executed in parallel in the distribution unit 22 in association with the individual distribution buffers 22a. As illustrated in FIG. 21, therefore, the distribution unit 22 transfers transaction information corresponding to data 1 (R1) in the slot 1 to the distribution buffer 22a-1 for the server 1 and the distribution buffer 22a-3 for the server 3 in accordance with the distribution definition 20b when informed of the number of the record at time t3 (step S2312). Likewise, when informed of the record number at time t6, the distribution unit 22 transfers the transaction information corresponding to data 1 (R2) in the slot 2 to the distribution buffer 22a-1 for the server 1 and the distribution buffer 22a-2 for the server 2 and transfers the transaction information corresponding to data 2 (R3) in the slot 2 to the distribution buffer 22a-2 for the server 2 and the distribution buffer 22a-3 for the server 3 (step S2312).

Thereafter, transaction information stored in the distribution buffer 22a-1 for the server 1 are transmitted to the server 1 every time ten pieces of transaction information are collected therein, transaction information stored in the distribution buffer 22a-2 for the server 2 are transmitted to the server 2 at 5 o'clock every day, and transaction information stored in the distribution buffer 22a-3 for the server 3 are transmitted to the server 3 every hour (step S2308).

<Advantage of Embodiment>

As described above, the second embodiment has all the advantages of the first embodiment. Since the storage section 23 incorporating the non-volatile medium (hard disk) 23a intervenes between the acquisition unit 21 and the distribution unit 22 in the second embodiment, data held in the storage section 23 can be held even if the interserver data association apparatus 1 is deactivated. As the difference between the operational time zone of the transmission server 2 and the interserver data association apparatus 1 and the operational time zones of the reception servers can be nullified, the transmission server and interserver data association apparatus 1 can be operated independently of the transmission servers. As the acquisition definition 20a used by the acquisition unit 21 and the distribution definitions 20b used by the distribution unit 22 are provided separately from each other and are independent from each other, only the acquisition definition may be made from the sender side and only the distribution definition may be made from the receiver side, thus improving the independency of the individual servers.

Third Embodiment

In the second embodiment, the distribution unit 22 is executing the process in FIG. 17 for each distribution buffer 22a. In the process in FIG. 17, the distribution unit 22 directly accesses the storage section 23 and writes only the necessary data in the distribution buffers 22a. Therefore, the number of accesses to the non-volatile medium 23a which generally takes more time than the access to a volatile memory become greater in proportion to the number of the distribution buffers 22a and the reception servers 3. The number of the reception servers 3 cannot thus be increased.

To overcome this problem, the third embodiment is provided with a grouping unit which reads data from the storage section once and distributes the read data to the distribution buffer that needs the data. This arrangement requires only a single access to the data stored in the storage section, thus improving the distributing efficiency.

Since the distribution right is shifted to the grouping unit from the individual processes in the distribution unit, however, all the distribution definitions should be referred to for each data read from the storage section and for each process of data distribution to each distribution buffer. This lowers the distributing efficiency.

According to the third embodiment, therefore, an extended version of the mapping definition 10a used in the first embodiment is used to avoid the reference to all the distribution definitions for each distributing process. In this case, the resource identifier defined in the distribution definition can be different from the resource identifier defined in the acquisition definition because the association of those definitions can be defined in the extended mapping definition. Accordingly, the reception servers 3a–3c can give specific names to the data they want to use. More specifically, the transmission server 2 defines the resources with the resource identifiers specific to the sender side while the reception servers 3a–3c define the resources with the resource identifiers specific to the receiver side. The application programs in the reception servers 3a–3c can therefore specifically name variables independently of the application program in the transmission server 2. This further improves the independency. The extended mapping definition is to be prepared with the agreement between the sender side and the receiver side.

<Connection With Servers>

The structures of the above-described main center 2, backup center 3a, information system server 3b and batch processing server 3c, and the connection between those servers 2, 3a–3c and the interserver data association apparatus 1 in the third embodiment are quite the same as those of the first embodiment. Therefore, their descriptions will be omitted, while FIGS. 2 through 4 referred to.

<Interserver Data Association Apparatus>

[Internal Structure]

The internal structure of the interserver data association apparatus 1 used in the third embodiment will be described below. In the following description, the main business server in the main center 2 is called a "transmission server," and the main business server in the backup center 3a, the information system server 3b and the batch processing server 3c are collectively called "reception servers." It is assumed that as the number of "reception servers" which are connected to the interserver data association apparatus 1 is n, numbers "1" to "n" are given to the individual reception servers 3.

Figure 22:
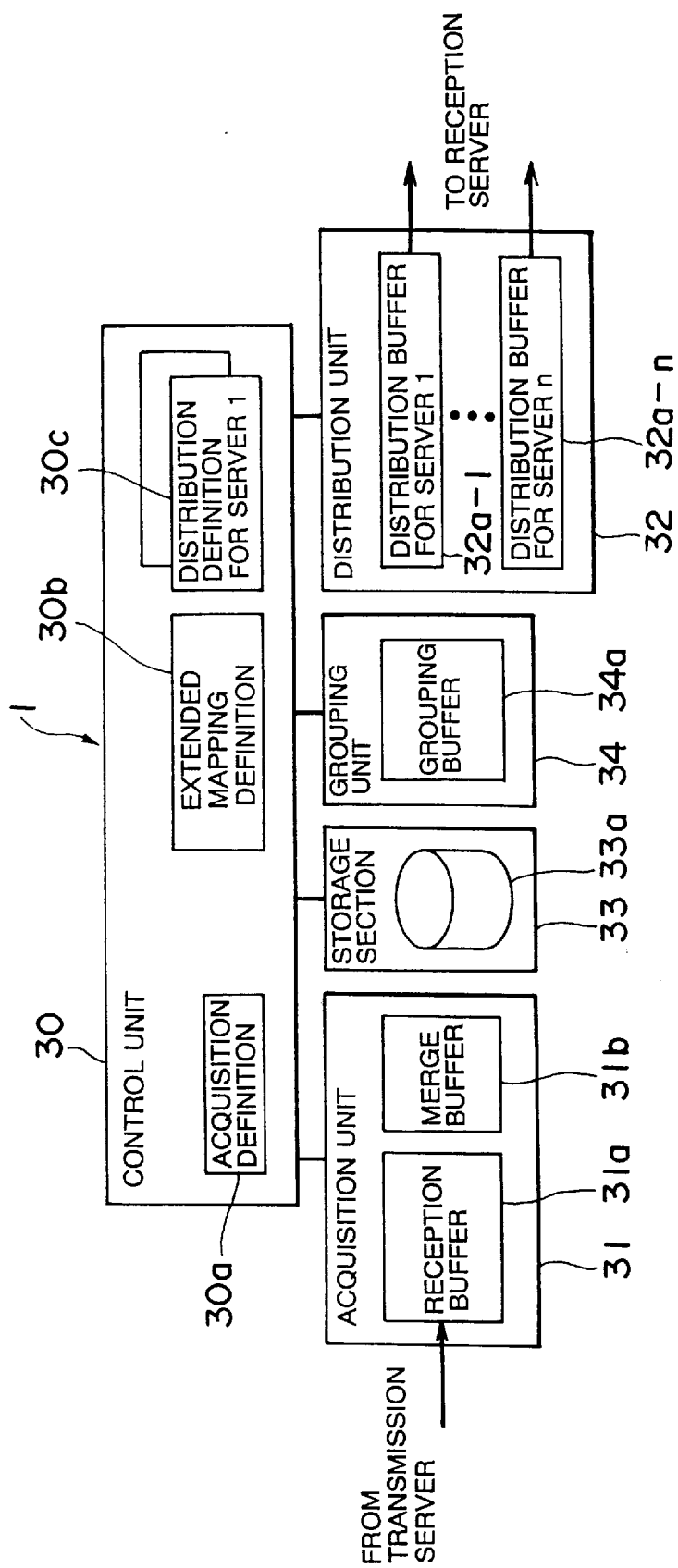
FIG. 22 is a block diagram showing the structure of an interserver data association apparatus according to a third embodiment of this invention.

As shown in FIG. 22, the interserver data association apparatus 1 comprises a control unit 30 and an acquisition unit 31 as reception means, a storage section 33, a grouping unit 34 as identification means and a distribution unit 32 as distribution means connected to the control unit 30 respectively.

The acquisition unit 31 receives the transaction information sent from the transmission server 2 and refers to the acquisition definition 30a stored in the control unit 30 to group the transaction information, transaction by transaction and in the transaction order. The acquisition unit 31 has a reception buffer 31a and a merge buffer 31b and accomplishes the aforementioned functions by running a program.

The reception buffer 31a receives transaction information sent from the transmission server 2.

The transaction information is transferred to the merge buffer 31b from the reception buffer 31a. This merge buffer 31b has a plurality of slots, and stores transaction information having the same transaction identifier (Ti) for each slot. When every transaction information about the same transaction is written in any slot, i.e., when transaction information indicating the end of the transaction (R3) is written in the merge buffer 31b, all the transaction information written in the associated slot are transferred to the storage section 33.

The storage section 33 has the non-volatile medium 33a. When receiving the transaction information from the merge buffer 31b, the storage section 33 writes this transaction information in a non-volatile medium (hard disk) 33a to make it non-volatile, and reports the record in the non-volatile medium (hard disk) 33a where the transaction information has been written, to the grouping unit 34. The storage section 23 accomplishes the aforementioned functions by running a program.

The transaction information is transferred to the non-volatile medium 33a from the merge buffer 31b. This non-volatile medium 33a has a plurality of records associated with the slots in the merge buffer 31b. The transaction information is transferred between the slots in the merge buffer 31b and the associated records in the non-volatile medium 33a.

The grouping unit 34 reads all the transaction information written in the record informed by the storage section 33, and writes the read transaction information in a group buffer 34a. The grouping unit 34 distributes only the necessary information from among the transaction information written in the grouping buffer 34a, to distribution buffers 32a for the individual reception servers by referring to the extended mapping definition 30b stored in the control unit 30. The grouping unit 34 has the grouping buffer 34a, and accomplishes the aforementioned functions by running a program.

The transaction information is transferred to the grouping buffer 34a from the storage section 33. This grouping buffer 34a has a plurality of records associated with the records in the non-volatile medium 33a. The transaction information is transferred between the records in the non-volatile medium 33a and the associated records in the grouping buffer 34a.

The distribution unit 32 sends the transaction information distributed from the grouping unit 34 to the individual reception servers 3a–3c by referring to a distribution definition 30c stored in the control unit 30. The distribution unit 32 has distribution buffers 32a associated in number with the reception servers 3a–3c connected to the interserver data association apparatus 1, and accomplishes the aforementioned functions by running a program.

The transaction information transferred from the grouping unit 34 is written in each distribution buffer 32a. The distribution buffer 32a sends the stored transaction information to the associated transmission server 3a, 3b or 3c at the timing requested by this associated reception server.

The control unit 30 controls the operations of the acquisition unit 31, the storage section 33, the grouping unit 34, and the distribution unit 32, and transfers transaction information among the acquisition unit 31, the storage section 33, the grouping unit 34, and distribution unit 32. This control unit 30 is a functional module which is accomplished by running programs. The control unit 30 has the acquisition definition 30a which defines the condition for acquiring transaction information in the merge buffer 31b, the extended mapping definition 30b which defines the condition for distributing the transaction information to the distribution buffers 32a in the grouping unit 34, and the distribution definitions 30c which define the trigger conditions for transmitting transaction information to the reception servers from the associated distribution buffers 32a in the distribution unit 32. The distribution definitions 30c equal in number to the distribution buffers 32a are provided in association with the distribution buffers 32a.

[Acquisition Definition]

Figure 23:
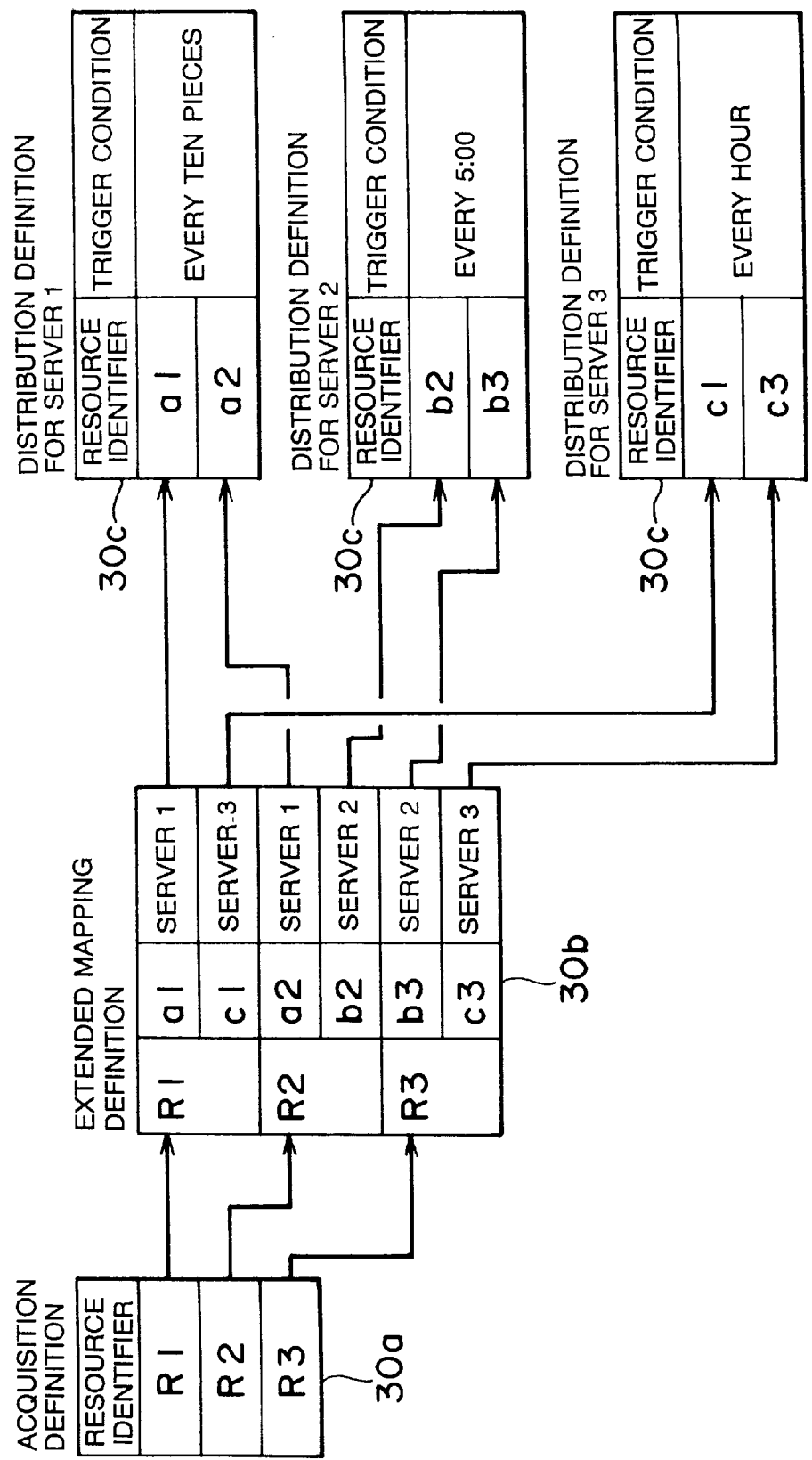
FIG. 23 is a diagram showing the structures of an acquisition definition, an extended mapping definition and each distribution definition in the third embodiment of this invention.

FIG. 23 shows the specific contents of the acquisition definition 30a. The acquisition definition 30a consists of a single table. This table 30a defines a "resource identifier" for determining the type of transaction information (indicating for which resource transaction information should be acquired) that is obtained in the merge buffer 31a. In the example in FIG. 23, it is defined that transaction information affixed with the resource identifiers "R1", "R2" and "R3" are acquired by the merge buffer 31a.

[Extended Mapping Definition]

FIG. 23 shows the specific contents of the extended mapping definition 30b. The extended mapping definition 30b consists of a single table. This table 30b defines a "resource identifier" for determining the type of transaction information (indicating for which resource transaction information should be acquired) in the transmission server 2, the reception server 3a, 3b or 3c to which each transaction information should be distributed (indicating which transaction information should be transferred to which server 3a, 3b or 3c), and a "resource identifier" for determining the type of the resource in the destination server 3a, 3b or 3c. In the example in FIG. 23, it is defined that transaction information affixed with the resource identifier "R1" is transferred to the server 1 as the transaction information of a resource identifier "a1", transaction information affixed with the resource identifier "R1" is transferred to the server 3 as the transaction information of a resource identifier "c1", transaction information affixed with the resource identifier "R2" is transferred to the server 1 as the transaction information of a resource identifier "a2", transaction information affixed with the resource identifier "R2" is transferred to the server 2 as the transaction information of a resource identifier "b2", transaction information affixed with the resource identifier "R3" is transferred to the server 2 as the transaction information of a resource identifier "b3", and transaction information affixed with the resource identifier "R3" is transferred to the server 3 as the transaction information of a resource identifier "c3".

[Distribution Definition]

FIG. 23 shows the specific contents of the distribution definition 30c. Each distribution definition 30c consists of a single table. This table 30c defines a "resource identifier" specific to the reception server 3a, 3b or 3c for determining the type of transaction information (indicating for which resource transaction information should be acquired) that is written in the associated distribution buffer 32a and the "trigger conditions" for determining the timings of distributing transaction information to the reception servers 3a–3c as the destinations. In the example in FIG. 23, it is defined that transaction information affixed with the resource identifier "a1" and transaction information affixed with the resource identifier "a2" are written in the distribution buffer 32a-1 for the server 1, and that every time ten pieces of transaction information are stored, the transaction information are transmitted to the server 1. It is also defined that the transaction information given the resource identifier "b2" and the transaction information given the resource identifier "b3" are written in the distribution buffer 32a-2 for the server 2, and that the transaction information are transmitted to the server 2 at 5 o'clock every day. It is further defined that the transaction information given the resource identifier "c1" and the transaction information given the resource identifier "c3" are written in the distribution buffer 32a-3 for the server 3, and that the transaction information are transmitted to the server 3 every hour.

[Acquisition Unit Algorithm]

Figure 24:
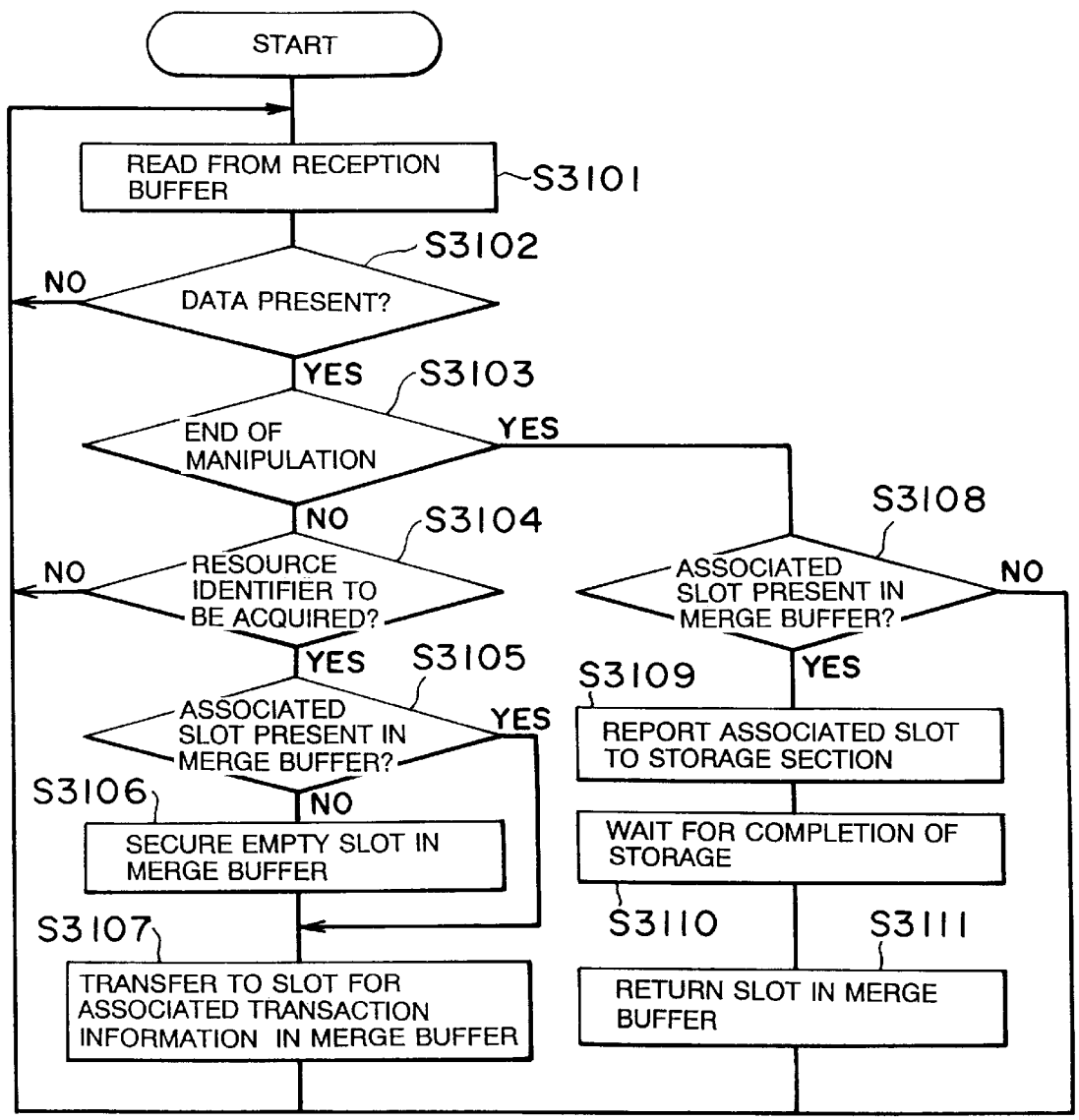
FIG. 24 is a flowchart illustrating a sequence of processes executed by an acquisition unit in FIG. 22.

FIG. 24 is a flowchart illustrating an algorithm executed by the acquisition unit 31. This flowchart starts when the interserver data association apparatus 1 is powered on. In step S3101, transaction information is read from the reception buffer 31a. In the next step S3102, it is determined if there is transaction information in the reception buffer 31a. When there is no transaction information, the flow returns to step S3101 and the above read and determination are repeated until transaction information is written in the reception buffer 31a. When transaction information exists, the flow proceeds to step S3103.

In step S3103, it is determined if the manipulation (Mj) item of the read transaction information is M3 (end of transaction). If it is not the end of the transaction, it is determined in the next step S3104 whether the resource identifier (Rk) of this transaction information corresponds to what is defined in the acquisition definition 30a. This step filters the item to be acquired. When the resource identifier (Rk) does not correspond to what is defined in the acquisition definition 30a, it is considered that there is no reception server 3 requiring the transaction information of this resource and this transaction information will be abandoned. The flow then returns to step S3101.

When the resource identifier (Rk) corresponds to what is defined in the acquisition definition 30a, on the other hand, it is determined in step S3105 whether the merge buffer 31b has a slot storing transaction information having the same transaction identifier (Ti) as the transaction identifier (Ti) of the transaction information in question. When there is such a slot, the flow proceeds to step S3107. When there is no such slot (there is no such slot in the initial state), an empty slot is secured in the merge buffer 31b in step S3106 and this empty slot is treated as the slot corresponding to the transaction identifier (Ti) of that transaction information. The flow then goes to step S3107.

In step S3107, the transaction information is transferred to the slot of the transaction identifier (Ti) in the merge buffer 31b. Thereafter, the flow returns to step S3101 to execute the process on the next transaction information.

When the manipulation (Mi) of the transaction information is M3 (end of the transaction), the processing proceeds to step S3108 from step S3103. In step S3108, it is determined whether the merge buffer 31b has a slot corresponding to the transaction identifier (Ti) of this transaction information. As there is such a corresponding slot, the slot number of this slot is reported to the storage section 33. Then, the acquisition unit 31 waits for the storage section 33 to complete the storage in accordance with the reported slot number in step S3110. When the storage is complete, the slot in the merge buffer 31b is returned in step S3111 (this slot is emptied to return to the initial state).

When it is found in step S3108 that only transaction information of M3 (end of the transaction) with respect to the transaction has been transmitted, on the other hand, there is no associated slot in the merge buffer 31b so that steps S3109 to S3111 will be skipped.

In any case, the processing returns to step S3101 to execute the process on the next transaction information.

[Storage Section Algorithm]

Figure 25:
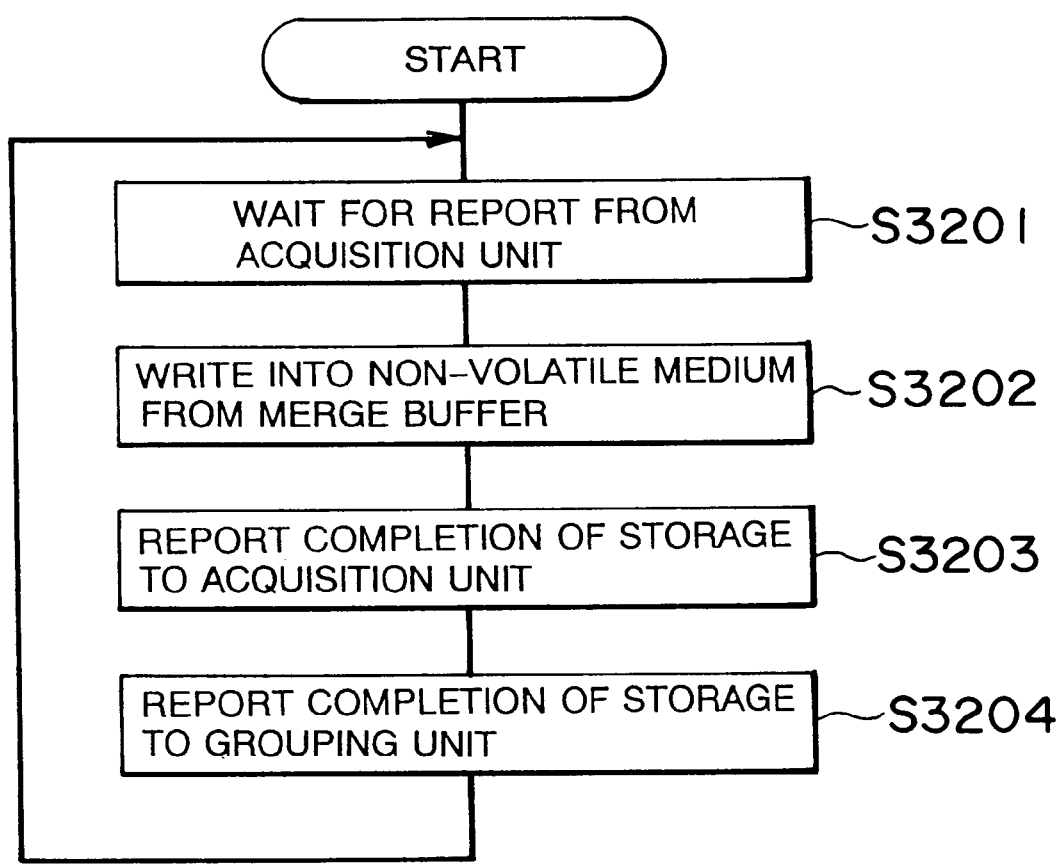
FIG. 25 is a flowchart illustrating a sequence of processes executed by a storage section in FIG. 22.

FIG. 25 is a flowchart illustrating an algorithm executed by the storage section 33. This flowchart starts when the interserver data association apparatus 1 is powered on.

In step S3201, the storage section 33 waits for the reporting of the slot number (step S3109) from the acquisition unit 31. When a slot number has been reported, the flow proceeds to step S3202.

In this step S3202, the contents of the informed slot in the merge buffer 31b are written in the non-volatile medium 33a. At the time this writing is carried out, the storage section 33 prepares a record associated with this slot in the non-volatile medium 33a. When the writing is completed, the flow goes to step S3203.

In this step S3203, the storage section 33 reports the completion of the storage to the acquisition unit 31. In the next step S3204, the storage section 33 reports the record number and the completion of the storage to the grouping unit 34. After those processes are finished, the flow returns to step S3201.

[Grouping Unit Algorithm]

Figure 26:
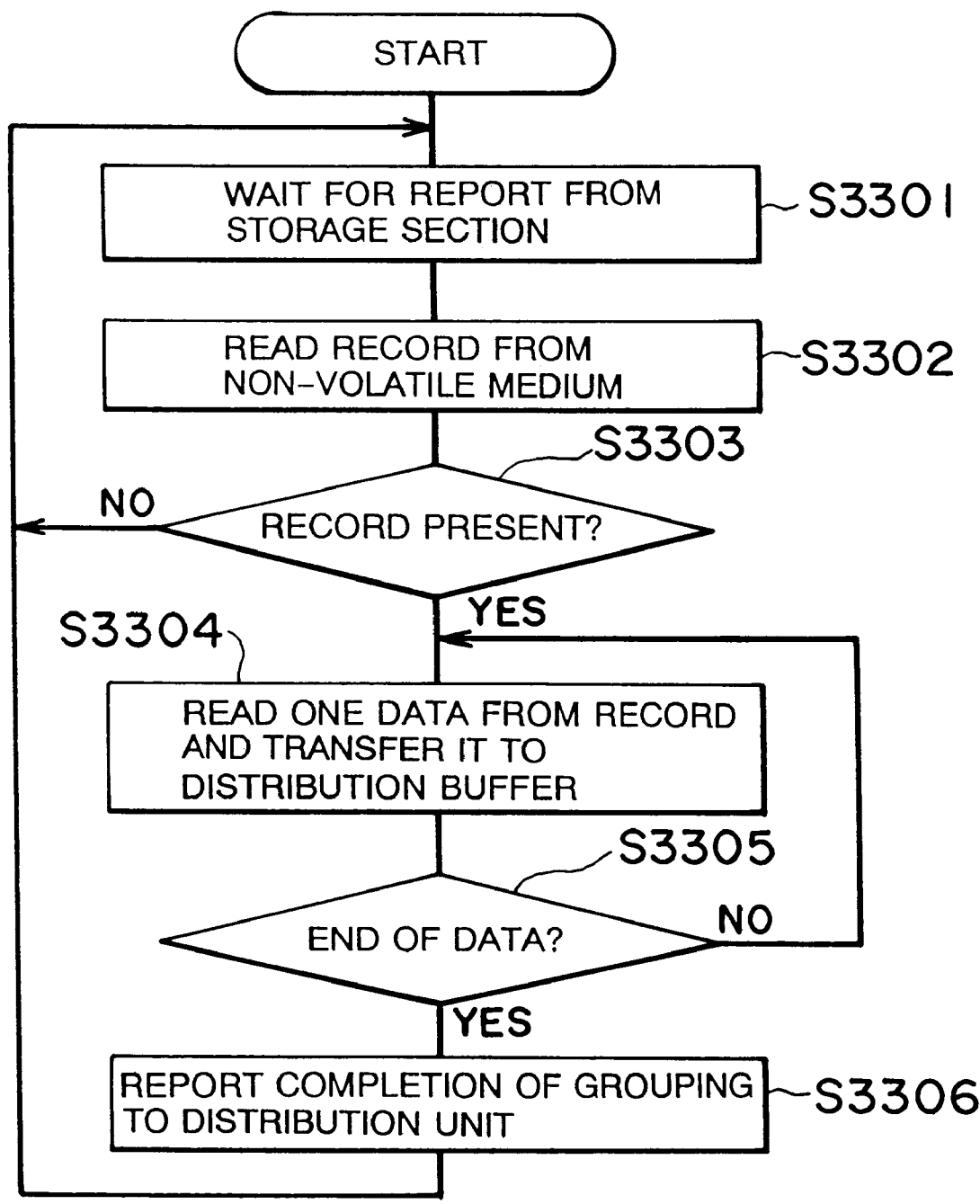
FIG. 26 is a flowchart illustrating a sequence of processes executed by a grouping unit in FIG. 22.

FIG. 26 is a flowchart illustrating an algorithm executed by the grouping unit 34.

This flowchart starts when the interserver data association apparatus 1 is powered on. In step S3301, the grouping unit 34 waits for the report of the completion of the storage from the storage section 33. In the next step S3302, based on the record number informed by the storage section 33, the grouping unit 34 reads all the transaction information stored in the associated record in the non-volatile medium 33a and writes the transaction information in the associated record in the grouping buffer 34a.

It is then determined in step S3303 if there is transaction information in this associated record. When there is no transaction information, the flow returns to step S3301.

When there is transaction information, on the other hand, the flow proceeds to the loop of steps S3304 and S3305. This loop is executed step by step for each piece of transaction information read from the associated record in the non-volatile medium 33a.

In step S3304, the transaction information is read from the record in the grouping buffer 34a where this transaction information has been written in step S3302, and is transferred to the associated distribution buffer 32a. This information transfer is executed by referring to the extended mapping definition 30b. More specifically, the name of the reception server associated with the resource identifier (Rk) of the read transaction information is read out from the extended mapping definition 30b and the transaction information is transferred to all the associated reception servers. At the time of transfer, the resource identifier (Rk) of the transaction information is rewritten to the name of the resource identifier associated with the destination server by referring to the extended mapping definition 30b.

The flow then proceeds to step S3305 to check if there remains unprocessed transaction information in the associated record in the non-volatile medium 33a. If unprocessed transaction information remains, the flow returns to step S3304 to execute the above-described process on the next transaction information.

When it is determined in step S3305 that no unprocessed transaction information is remaining, the completion of the grouping is reported to the distribution unit 32. Then, the flow returns to step S3301.

[Distribution Unit Algorithm]

Figure 27:
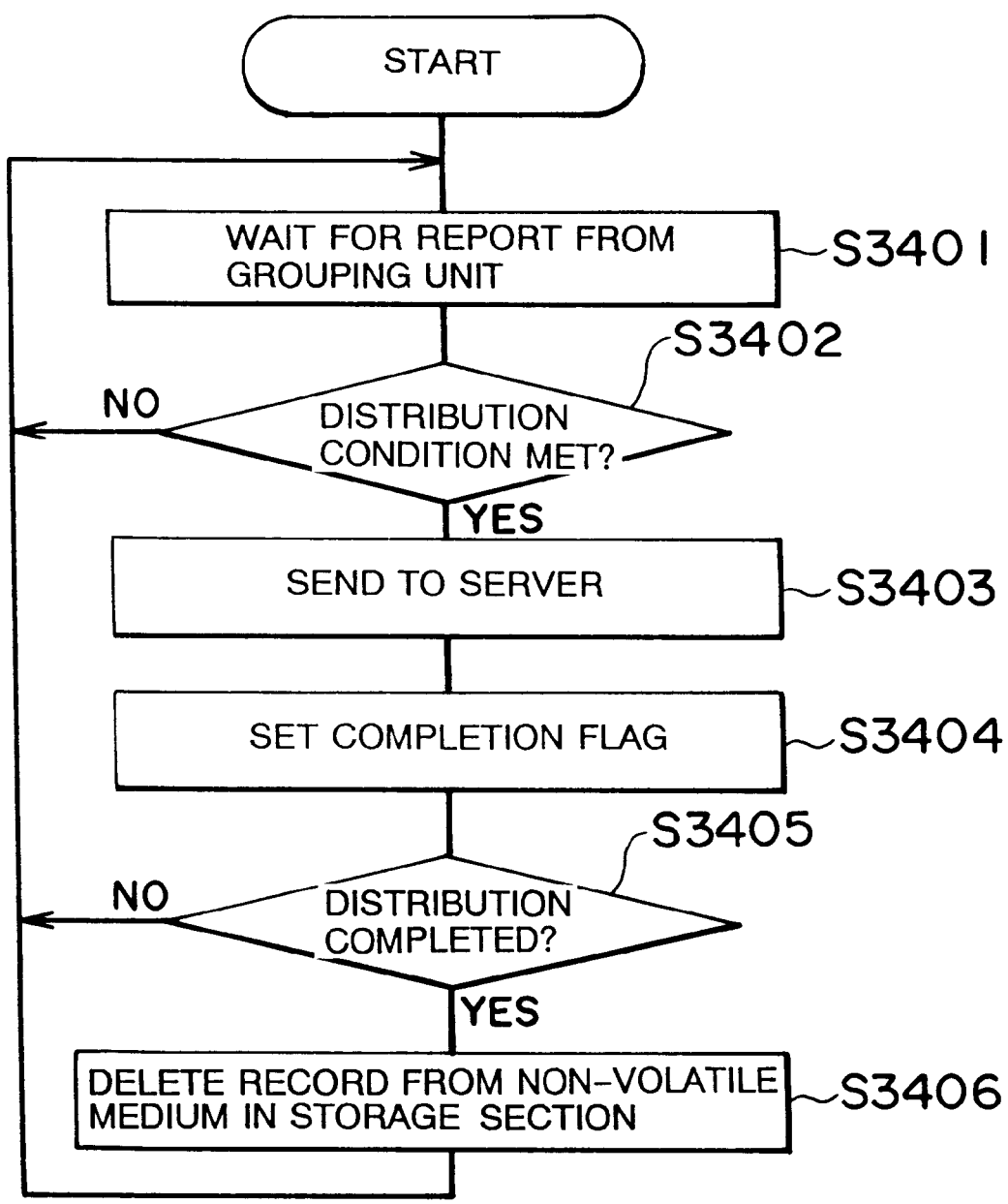
FIG. 27 is a flowchart illustrating a sequence of processes executed by a distribution unit in FIG. 22.

FIG. 27 is a flowchart illustrating an algorithm executed by the distribution unit 32. The distribution unit 32 executes a plurality of algorithms in parallel for each distribution buffer 32a.

This flowchart starts when the interserver data association apparatus 1 is powered on. In step S3401, the distribution unit 32 waits for the report of the completion of the grouping from the grouping unit 34 in step S3306.

In the subsequent step S3402, it is checked if the distribution condition is met. This check is made by referring to the trigger condition in the associated distribution definition 30c.

When the distribution condition is not met, the flow returns to step S3401. When the distribution condition is satisfactory, on the other hand, the transaction information stored in the target distribution buffer 32a is transmitted to the associated server in step S3403.

In the subsequent step S3404, a complete flag is set in the complete indication areas as shown in FIG. 9. There are a plurality of complete indication areas provided in the distribution unit 32 in association with the individual records in the non-volatile medium 33a It is then checked in step S3405 if distribution for every server has been completed in the complete indication areas. With regard to the complete indication area which indicates that distribution for every server has been completed, the associated record in the non-volatile medium 33a is returned in step S3406. With regard to the complete indication area which indicates that distribution for every server has not been completed, step S3406 is skipped. In any case, the flow then returns to S3401.

<Specific Example of Processing>

A specific example of the processing in the above-described algorithm will be discussed below. The following description will be given on the premise that transaction information have been transmitted from the transmission server 2 consecutively in the order as shown in FIG. 4. It is assumed that the contents of the acquisition definition 30a, the extended mapping definition 30b and the distribution definitions 30c are as illustrated in FIG. 23. It is also assumed that the processes in FIGS. 24 through 27 are executed at a sufficiently high speed and the time lag needed for the data transfer among the individual buffers and the non-volatile medium 33a is negligible.

Figure 28:
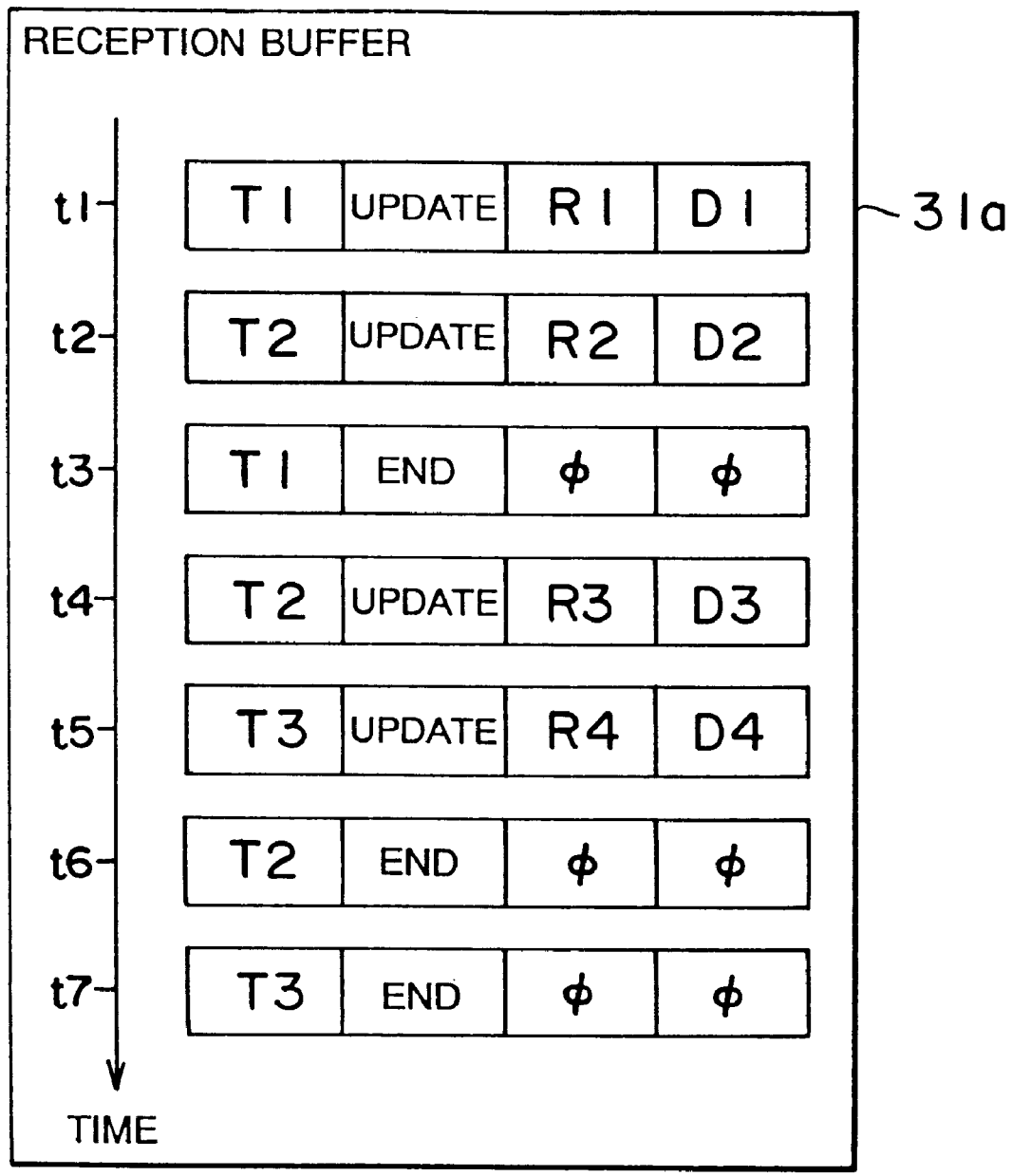
FIG. 28 is a diagram showing an example of what is received by a reception buffer in FIG. 22.

In this case, transaction information are sequentially written in the reception buffer 31a at the timings shown in FIG. 28.

Figure 29:
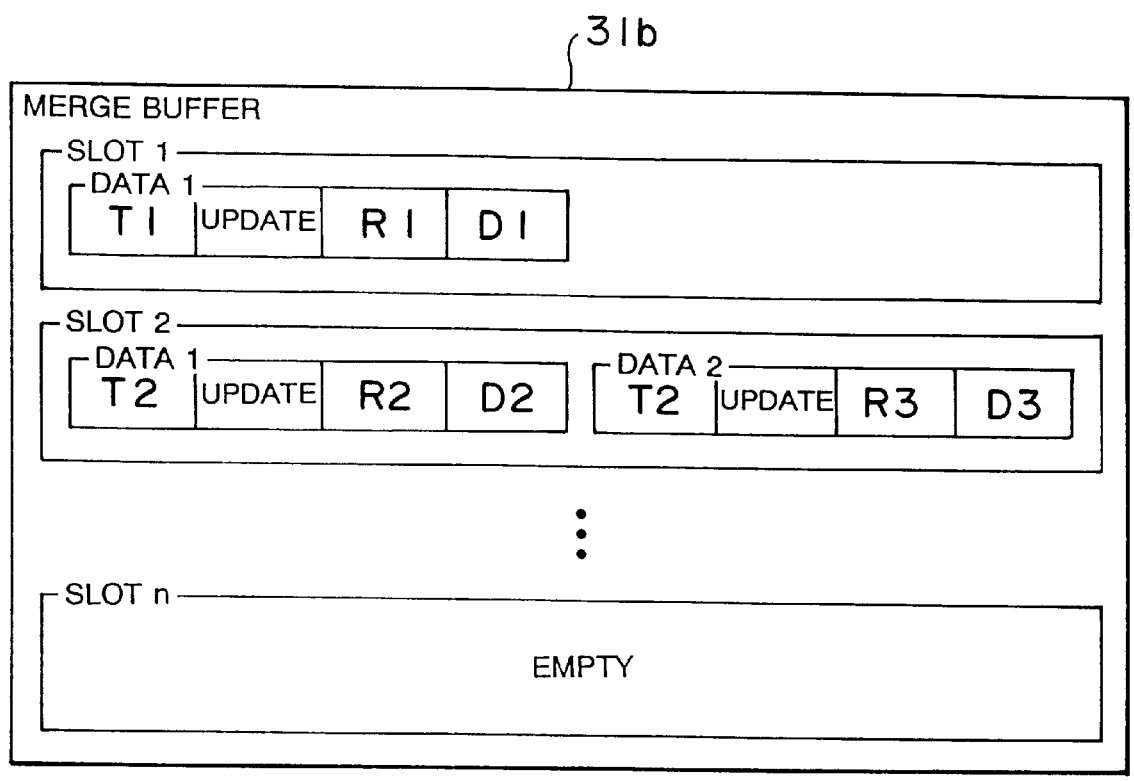
FIG. 29 is a diagram showing an example of what is received by a merge buffer in FIG. 22.

Since the acquisition unit 31 is performing the process in FIG. 24 at the same time as the writing of the transaction information, each transaction information is written in the merge buffer 31b in the form shown in FIG. 29. FIG. 29 shows the status at time t7. The slot 1 in FIG. 29 corresponds to the transaction T1, and the slot 2 corresponds to the transaction T2. As the transactions only up to T3 have occurred at the point of time t7, the slot n (n>3) is empty. Since the resource R4 is not defined in the acquisition definition 30a, the transaction information about the resource (R4) at time t5 is discarded (step S3104).

As a result of executing the process illustrated in FIGS. 24 and 25, the transaction information stored in the slot 1 is transferred to the storage section 33 at time t3 and the transaction information stored in the slot 2 is transferred to the storage section 33 at time t6 (steps S3109 and S3202).

Figure 30:
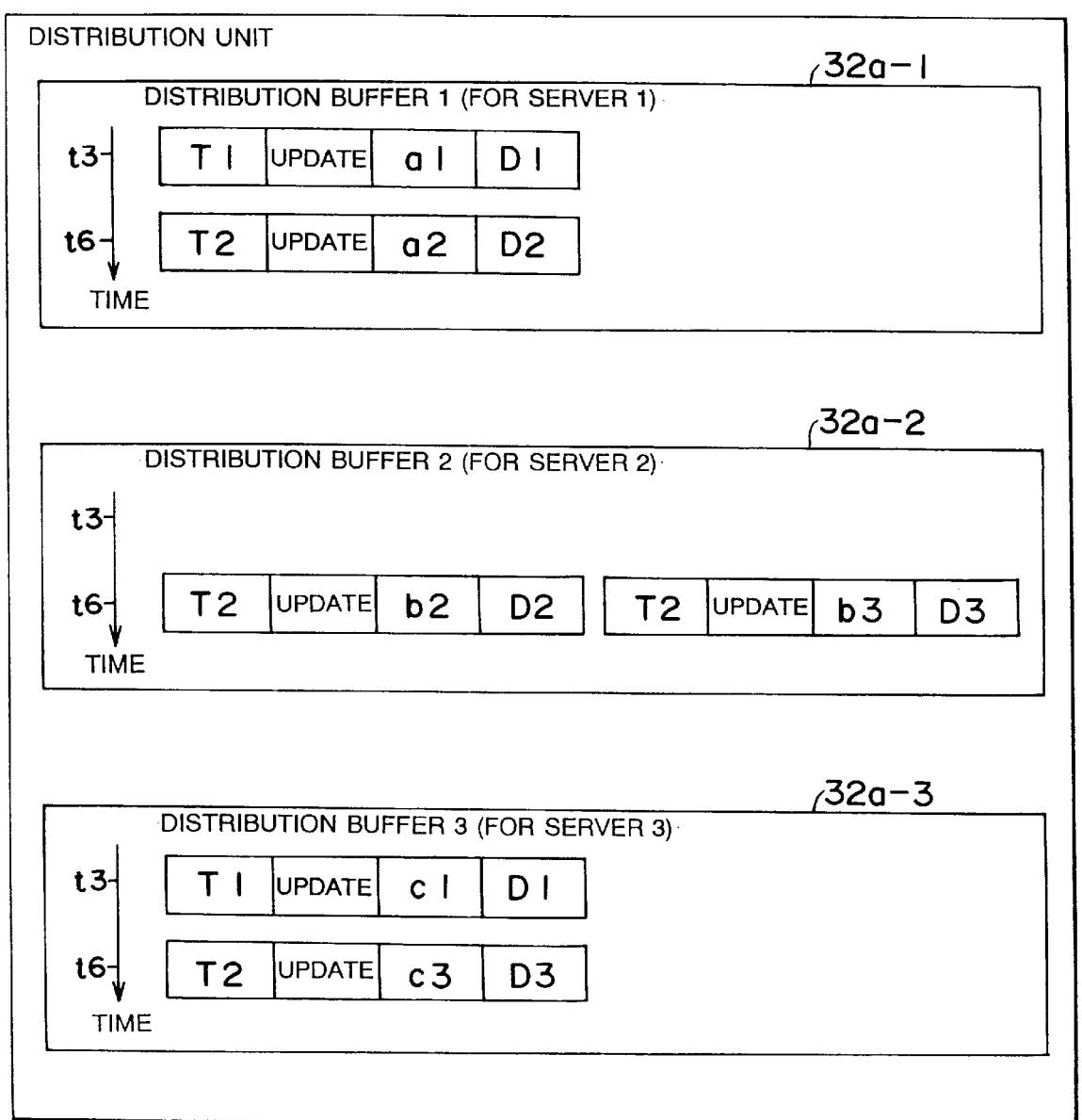
FIG. 30 is a diagram showing an example of what is received by each distribution buffer in FIG. 22.

The process in FIG. 26 is executed in the grouping unit 34. As shown in FIG. 30, therefore, when the grouping unit 34 is informed of the record number at time t3, the grouping unit 34 transfers the transaction information (R1) corresponding to data 1 in the slot 1 to the group buffer 34a from the non-volatile medium 33a (step S3302). In accordance with the extended mapping definition 30b, the transaction information (R1) is transferred to the distribution buffer 32a-1 for the server 1 as transaction information (a1) and to the distribution buffer 32a-3 for the server 3 as transaction information (c1) (step S3304). Likewise, when the grouping unit 34 is informed of the record number at time t6, the grouping unit 34 transfers the transaction information (R2) corresponding to data 1 in the slot 2 and transaction information (R3) corresponding to data 2 in the slot 2 to the grouping buffer 34a from the non-volatile medium 33a (step S3302). In accordance with the extended mapping definition 30b, the transaction information (R2) is transferred to the distribution buffer 32a-1 for the server 1 as transaction information (a2) and to the distribution buffer 32a-2 for the server 2 as transaction information (b2) (step S3304). In accordance with the extended mapping definition 30b, the transaction information (R3) is transferred to the distribution buffer 32a-2 for the server 2 as transaction information (b3) and to the distribution buffer 32a-3 for the server 3 as transaction information (c3) (step S3304).

The process in FIG. 27 is executed in parallel in the distribution unit 32 in association with the individual distribution buffers 32a. Therefore, transaction information stored in the distribution buffer 32a-1 for the server 1 are transmitted to the server 1 every time ten pieces of transaction information are collected in the buffer 32a-1, transaction information stored in the distribution buffer 32a-2 for the server 2 are transmitted to the server 2 at 5 o'clock every day, and transaction information stored in the distribution buffer 32a-3 for the server 3 are transmitted to the server 3 every hour (step S3403).

<Advantage of Embodiment>

As described above, the third embodiment has all the advantages of the second embodiment. In the third embodiment, the grouping unit 34 reads data from the storage section 33 once and distributes the read data to the distribution buffer 32a that needs the data. This thus requires a single access to the data stored in the storage section 33, thus improving the distributing efficiency.

Since the extended mapping definition 30b is used in the third embodiment, the grouping unit 34 should simply refer to this extended mapping definition 30b to be able to distribute the transaction information to the distribution buffer 32a that needs this information. Further, the resource identifier of the transmission server 2 can be associated with the resource identifiers of the reception servers 3a–3c in the third embodiment. The reception servers 3a–3c can therefore give specific names to the data they want to use themselves, thus further improving the independency.

Fourth Embodiment

The distribution buffer 32a in the third embodiment is constituted of a volatile memory. When the interserver data association apparatus 1 is powered off, therefore, the transaction information written in this distribution buffer 32a is lost. If the transmission server and the reception servers are provided on separate systems, therefore, when the reception server 3a, 3b or 3c fails (ABEND of the application program or system down occurs), the system cannot be restored unless the interserver data association apparatus 1 is reset and the process returns to the reading of data from the storage section 33.

To overcome this shortcoming, a non-volatile medium is provided in the distribution unit in the fourth embodiment so that data written in the distribution buffer is not lost. When any reception server or the interserver data association apparatus fails, therefore, it is unnecessary to return the process to the data reading from the storage section so that data distribution can be resumed promptly, thus improving the reliability of the interserver data association apparatus.

<Connection With Servers>

The structures of the above-described main center 2, backup center 3a, information system server 3b and batch processing server 3c, and the connection between those servers 2, 3a–3c and the interserver data association apparatus 1 in the fourth embodiment are quite the same as those of the first embodiment. Therefore, their descriptions will be omitted, while FIGS. 2 through 4 referred to.

<Interserver Data Association Apparatus>

[Internal Structure]

The internal structure of the interserver data association apparatus 1 used in the fourth embodiment will be described below. In the following description, the main business server in the main center 2 is called a "transmission server," and the main business server in the backup center 3a, the information system server 3b and the batch processing server 3c are collectively called "reception servers." It is assumed that as the number of "reception servers" which are connected to the interserver data association apparatus 1 is n, numbers "1" to "n" are given to the individual reception servers 3.

Figure 31:
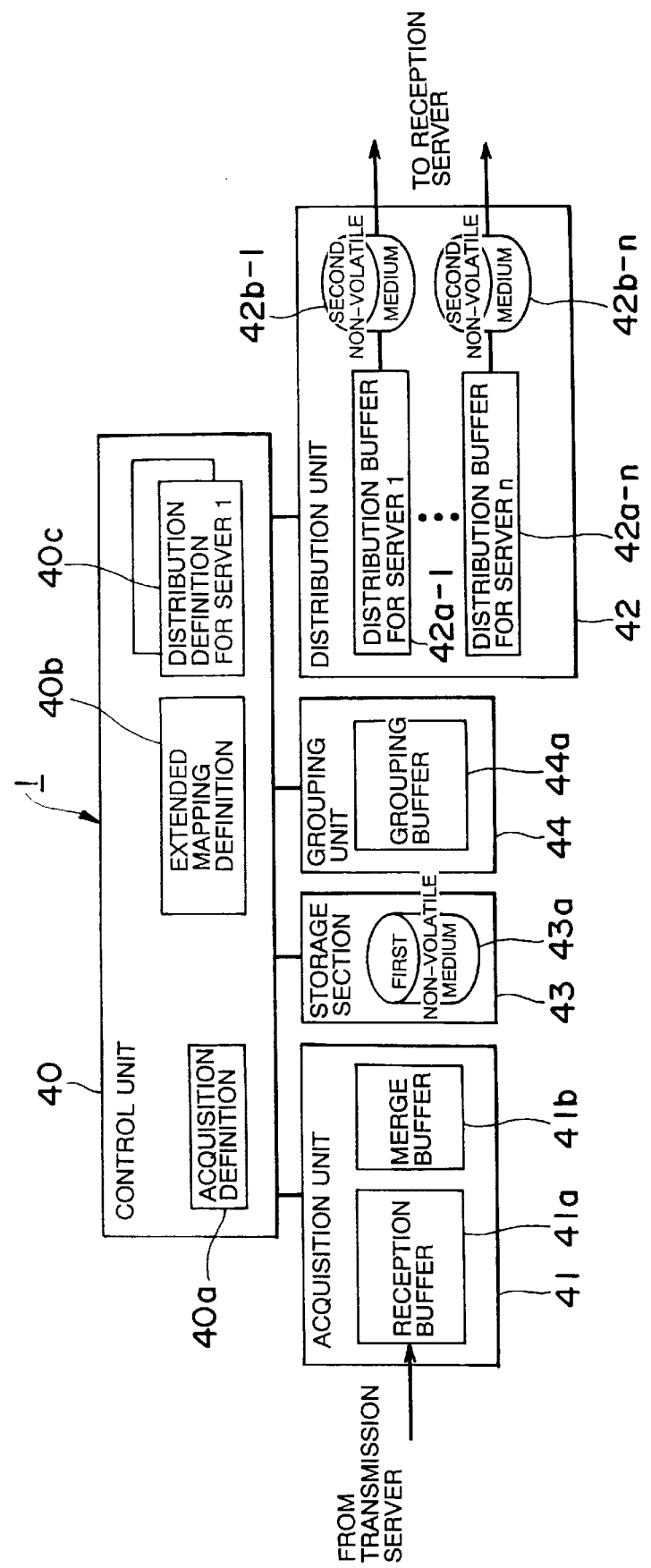
FIG. 31 is a block diagram showing the structure of an interserver data association apparatus according to a fourth embodiment of this invention.

As shown in FIG. 31, the interserver data association apparatus 1 comprises a control unit 40 and an acquisition unit 41 as reception means, a storage section 43, a grouping unit 44 as identification means, and a distribution unit 42 as distribution means connected to the control unit 40 respectively.

The acquisition unit 41 receives the transaction information sent from the transmission server 2 and refers to the acquisition definition 40a stored in the control unit 40 to group the transaction information, transaction by transaction and in the transaction order. The acquisition unit 41 has a reception buffer 41a and a merge buffer 41b and accomplishes the aforementioned functions by running a program.

The reception buffer 41a receives transaction information sent from the transmission server 2.

The transaction information is transferred to the merge buffer 41b from the reception buffer 41a. This merge buffer 41b has a plurality of slots, and stores transaction information having the same transaction identifier (Ti) for each slot. When every transaction information about the same transaction is written in any slot, i.e., when transaction information indicating the end of the transaction (R3) is written in the merge buffer 41b, all the transaction information written in the associated slot are transferred to the storage section 43.

The storage section 43 has the first non-volatile medium 43a. When receiving the transaction information from the merge buffer 41b, the storage section 43 writes this transaction information in a first non-volatile medium (hard disk) 43a to make it non-volatile, and reports the record in the first non-volatile medium (hard disk) 43a where the transaction information has been written, to the grouping unit 44. The storage section 23 accomplishes the aforementioned functions by running a program.

The transaction information is transferred to the first non-volatile medium 43a from the merge buffer 41b. This first non-volatile medium 43a has a plurality of records associated with the slots in the merge buffer 41b. The transaction information is transferred between the slots in the merge buffer 41b and the associated records in the first non-volatile medium 43a.

The grouping unit 44 reads all the transaction information written in the record informed by the storage section 43, and writes the read transaction information in a grouping buffer 44a. The grouping unit 44 distributes only the necessary information from among the transaction information written in the grouping buffer 44a, to distribution buffers 42a for the individual reception servers by referring to the extended mapping definition 40b stored in the control unit 40. The grouping unit 44 has the grouping buffer 44a, and accomplishes the aforementioned functions by running a program.

The transaction information is transferred to the grouping buffer 44a from the storage section 43. This grouping buffer 44a has a plurality of records associated with the records in the first non-volatile medium 43a. The transaction information is transferred between the records in the first non-volatile medium 43a and the associated records in the grouping buffer 44a. The distribution unit 42 sends the transaction information distributed from the grouping unit 44 to the individual reception servers 3a–3c by referring to a distribution definition 40c stored in the control unit 40. The distribution unit 42 has distribution buffers 42a associated in number with the reception servers 3a–3c connected to the interserver data association apparatus 1, and accomplishes the aforementioned functions by running a program.

The transaction information transferred from the grouping unit 44 is written in each distribution buffer 42a. The written transaction information is transferred to a second non-volatile medium 42b. The transaction information stored in the second non-volatile medium 42b is transmitted to the associated transmission server 3a, 3b or 3c at the timing requested by this associated reception server.

The control unit 40 controls the operations of the acquisition unit 41, the storage section 43, the grouping unit 44, and the distribution unit 42, and transfers transaction information among the acquisition unit 41, the storage section 43, the grouping unit 44, and distribution unit 42. This control unit 40 is a functional module which is accomplished by running programs. The control unit 40 has the acquisition definition 40a which defines the condition for acquiring transaction information in the merge buffer 41b, the extended mapping definition 40b which defines the condition for distributing the transaction information to the distribution buffers 42a in the grouping unit 44, and the distribution definitions 40c which define the trigger conditions for transmitting transaction information to the reception servers from the associated distribution buffers 42a in the distribution unit 42. The distribution definitions 40c equal in number to the distribution buffers 42a are provided in association with the distribution buffers 42a.

[Acquisition Definition]

Figure 32:
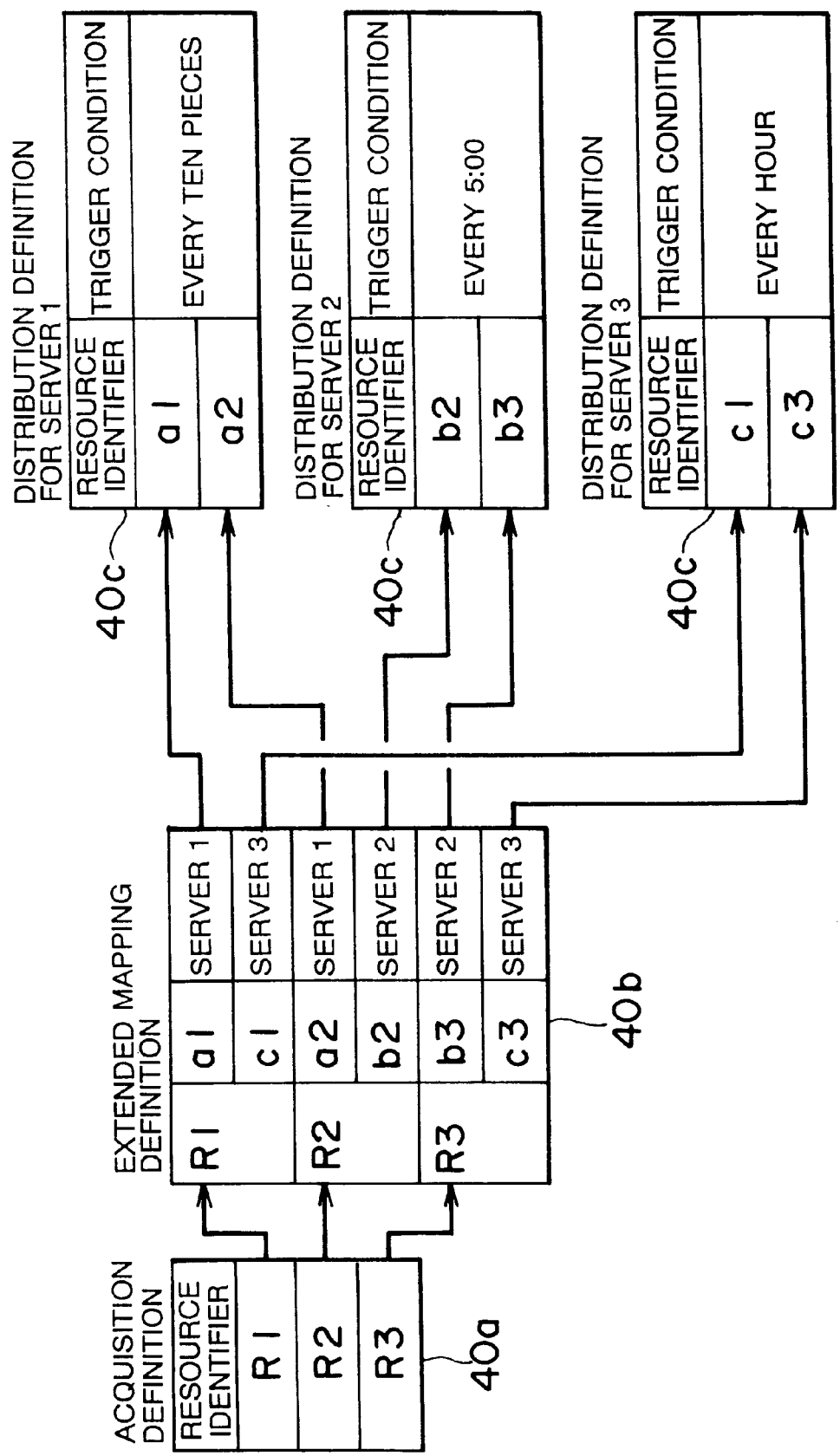
FIG. 32 is a diagram showing the structures of an acquisition definition, an extended mapping definition and each distribution definition in the fourth embodiment of this invention.

FIG. 32 shows the specific contents of the acquisition definition 30a. The acquisition definition 40a consists of a single table. This table 40a defines a "resource identifier" for determining the type of transaction information (indicating for which resource transaction information should be acquired) that is obtained in the merge buffer 41a. In the example in FIG. 32, it is defined that transaction information affixed with the resource identifiers "R1", "R2" and "R3" are to be acquired from the merge buffer 41a.

[Extended Mapping Definition]

FIG. 32 shows the specific contents of the extended mapping definition 40b. The extended mapping definition 40b consists of a single table. This table 40b defines a "resource identifier" for determining the type of transaction information (indicating for which resource transaction information should be acquired) in the transmission server 2, specifies the reception server 3a, 3b or 3c to which each transaction information should be distributed (indicating which transaction information should be transferred to which server 3a, 3b or 3c), and a "resource identifier" for determinating the type of the resource in the destination server 3a, 3b or 3c. In the example in FIG. 32, it is defined that transaction information affixed with the resource identifier "R1" is transferred to the server 1 as the transaction information of a resource identifier "a1", transaction information affixed with the resource identifier "R1" is transferred to the server 3 as the transaction information of a resource identifier "c1", transaction information affixed with the resource identifier "R2" is transferred to the server 1 as the transaction information of a resource identifier "a2", transaction information affixed with the resource identifier "R2" is transferred to the server 2 as the transaction information of a resource identifier "b2", transaction information affixed with the resource identifier "R3" is transferred to the server 2 as the transaction information of a resource identifier "b3", and transaction information affixed with the resource identifier "R3" is transferred to the server 3 as the transaction information of a resource identifier "c3".

[Distribution Definition]

FIG. 32 shows the specific contents of the distribution definition 40c. Each distribution definition 40c consists of a single table. This table 40c defines a "resource identifier" specific to each reception server for determining the type of transaction information (indicating for which resource transaction information should be acquired) that is written in the associated distribution buffer 42a and the "trigger conditions" for determining the timings of distributing transaction information to the reception servers 3a–3c as the destinations. In the example in FIG. 32, it is defined that transaction information affixed with the resource identifier "a1" and transaction information affixed with the resource identifier "a2" are written in the distribution buffer 42a-1 for the server 1, and that every time ten pieces of transaction information are stored, the transaction information are transmitted to the server 1. It is also defined that the transaction information given the resource identifier "b2" and the transaction information given the resource identifier "b3" are written in the distribution buffer 42a-2 for the server 2, and that the transaction information are transmitted to the server 2 at 5 o'clock every day. It is further defined that the transaction information given the resource identifier "c1" and the transaction information given the resource identifier "c3" are written in the distribution buffer 42a-3 for the server 3, and that the transaction information are transmitted to the server 3 every hour.

[Acquisition Unit Algorithm]

Figure 33:
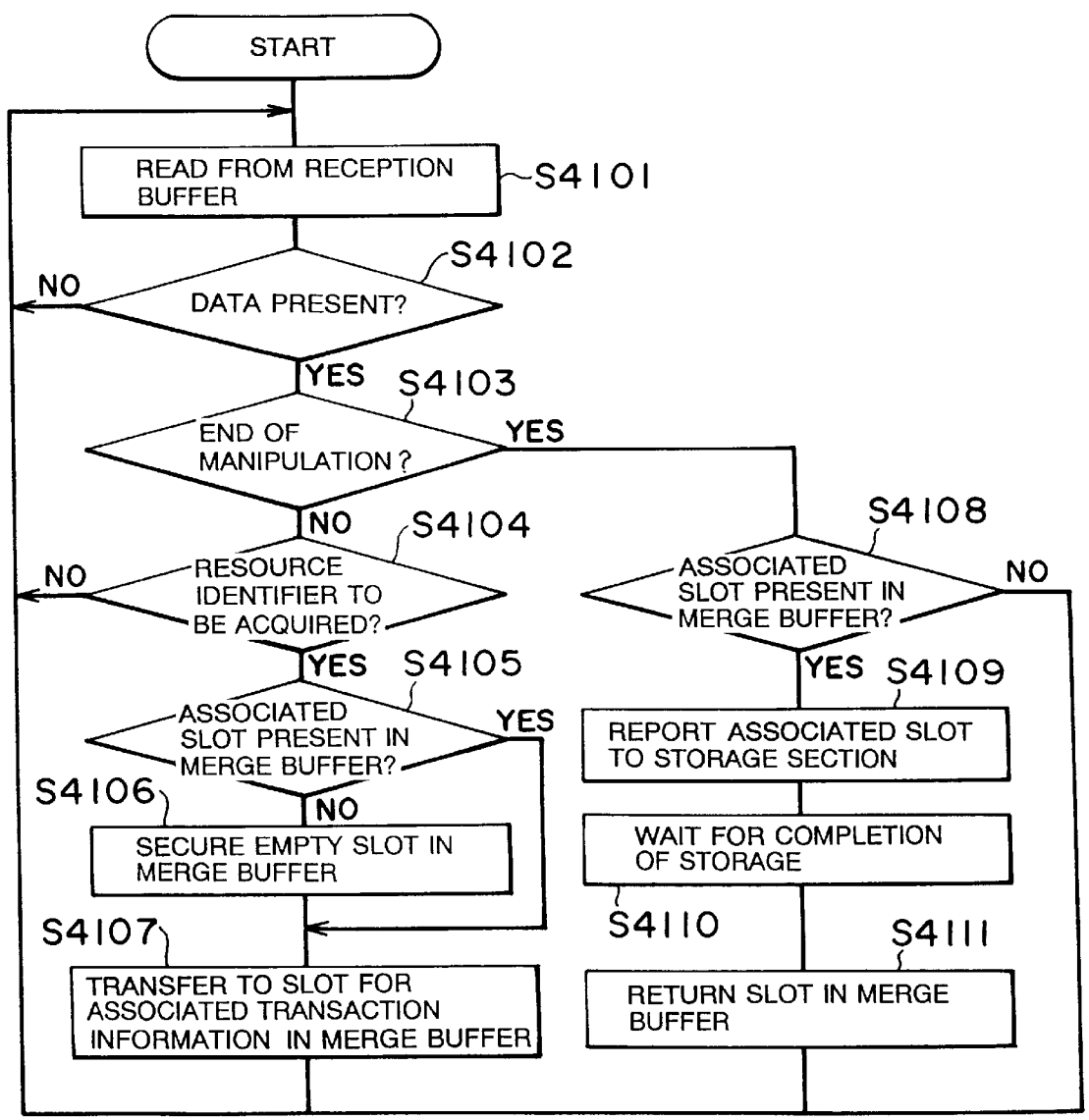
FIG. 33 is a flowchart illustrating a sequence of processes executed by an acquisition unit in FIG. 31.

FIG. 33 is a flowchart illustrating an algorithm executed by the acquisition unit 41. This flowchart starts when the interserver data association apparatus 1 is powered on. In step S4101, transaction information is read from the reception buffer 41a. In the next step S4102, it is determined if there is transaction information in the reception buffer 41a. When there is no transaction information, the flow returns to step S4101 and the above read and determination are repeated until transaction information is written in the reception buffer 41a. When transaction information exists, the flow proceeds to step S4103.

In step S4103, it is determined if the manipulation (Mj) item of the read transaction information is M3 (end of transaction). If it is not the end of the transaction, it is determined in the next step S4104 whether the resource identifier (Rk) of this transaction information corresponds to what is defined in the acquisition definition 40a. This step filters the item to be acquired. When the resource identifier (Rk) does not correspond to what is defined in the acquisition definition 40a, it is considered that there is no reception server 3 requiring the transaction information of this resource and this transaction information will be abandoned. The flow then returns to step S4101.

When the resource identifier (Rk) corresponds to what is defined in the acquisition definition 40a, on the other hand, it is determined in step S4105 whether the merge buffer 41b has a slot storing transaction information having the same transaction identifier (Ti) as the transaction identifier (Ti) of the transaction information in question. When there is such a slot, the flow proceeds to step S4107. When there is no such slot (there is no such slot in the initial state), an empty slot is secured in the merge buffer 41b in step S4106 and this empty slot is treated as the slot corresponding to the transaction identifier (Ti) of that transaction information. The flow then goes to step S4107.

In step S4107, the transaction information is transferred to the slot of the transaction identifier (Ti) in the merge buffer 41b. Thereafter, the flow returns to step S4101 to execute the process on the next transaction information.

When the manipulation (Mi) of the transaction information is M3 (end of the transaction), the processing proceeds to step S4108 from step S4103. In step S4108, it is determined whether the merge buffer 41b has a slot corresponding to the transaction identifier (Ti) of this transaction information. As there is such a corresponding slot, the slot number of this slot is reported to the storage section 43. Then, the acquisition unit 41 waits for the storage section 43 to complete the storage in accordance with the reported slot number in step S4110. When the storage is complete, the slot in the merge buffer 41b is returned in step S4111 (this slot is emptied to return to the initial state). When it is found in step S4108 that only transaction information of M3 (end of the transaction) with respect to the transaction has been transmitted, on the other hand, there is no associated slot in the merge buffer 41b so that steps S4109 to S4111 will be skipped.

In any case, the processing returns to step S4101 to execute the process on the next transaction information.

[Storage Section Algorithm]

Figure 34:
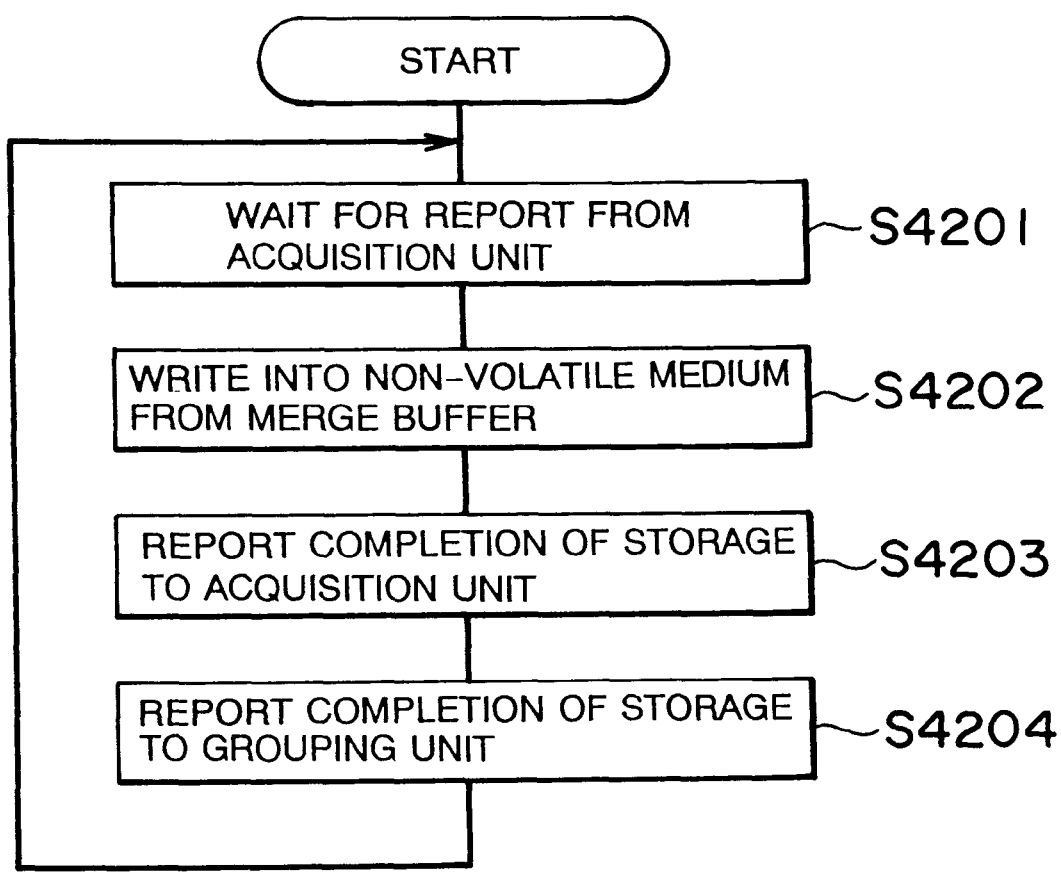
FIG. 34 is a flowchart illustrating a sequence of processes executed by a storage section in FIG. 31.

FIG. 34 is a flowchart illustrating an algorithm executed by the storage section 43. This flowchart starts when the interserver data association apparatus 1 is powered on.

In step S4201, the storage section 43 waits for the reporting of the slot number (step S4109) from the acquisition unit 41. When a slot number has been reported, the flow proceeds to step S4202.

In this step S4202, the contents of the informed slot in the merge buffer 41b are written in the first non-volatile medium 43a. At the time this writing is carried out, the storage section 43 prepares a record associated with this slot in the first non-volatile medium 43a. When the writing is completed, the flow goes to step S4203.

In this step S4203, the storage section 43 reports the completion of the storage to the acquisition unit 41. In the next step S4204, the storage section 43 reports the record number and the completion of the storage to the grouping unit 44. After those processes are finished, the flow returns to step S4201.

[Grouping Unit Algorithm]

Figure 35:
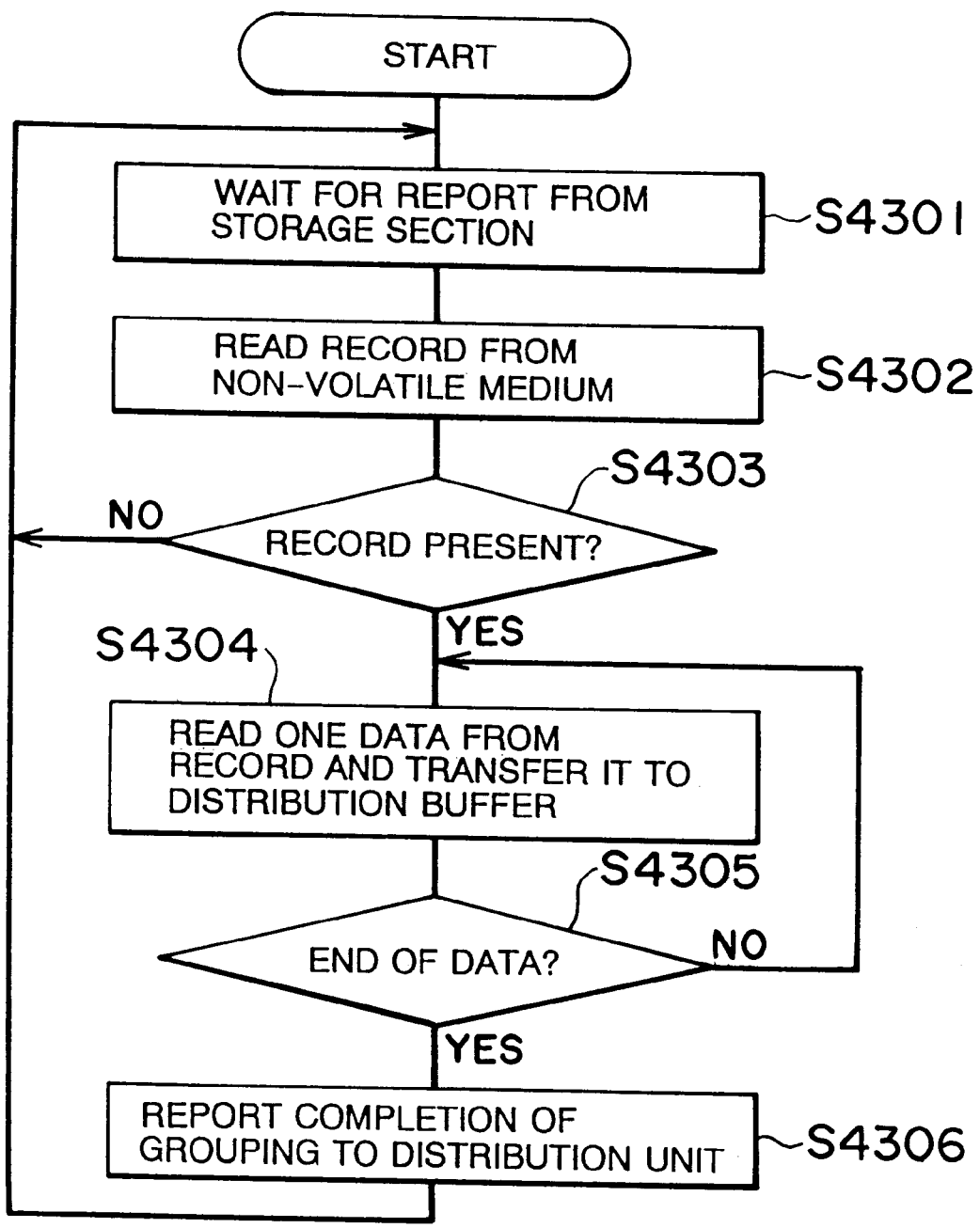
FIG. 35 is a flowchart illustrating a sequence of processes executed by a grouping unit in FIG. 31.

FIG. 35 is a flowchart illustrating an algorithm executed by the grouping unit 44.

This flowchart starts when the interserver data association apparatus 1 is powered on. In step S4301, the grouping unit 44 waits for the report of the completion of the storage from the storage section 43. In the next step S4302, based on the record number informed by the storage section 43, the grouping unit 44 reads all the transaction information stored in the associated record in the first non-volatile medium 43a and writes the transaction information in the associated record in the grouping buffer 44a.

It is then determined in step S4303 if there is transaction information in this associated record. When there is no transaction information, the flow returns to step S4301.

When there is transaction information, on the other hand, the flow proceeds to the loop of steps S4304 and S4305. This loop is executed step by step for each piece of transaction information read from the associated record in the first non-volatile medium 43a.

In step S4304, the transaction information is read from the record in the grouping buffer 44a where this transaction information has been written in step S4302, and is transferred to the associated distribution buffer 42a. This information transfer is executed by referring to the extended mapping definition 40b. More specifically, the name of the reception server associated with the resource identifier (Rk) of the read transaction information is read out from the extended mapping definition 40b and the transaction information is transferred to all the associated reception servers. At the time of transfer, the resource identifier (Rk) of the transaction information is rewritten to the name of the resource identifier associated with the destination server 3*a*, 3*b* or 3*c* by referring to the extended mapping definition 40*b*.

The flow then proceeds to step S4305 to check if there remains unprocessed transaction information in the associated record in the first non-volatile medium 43*a*. If unprocessed transaction information remains, the flow returns to step S4304 to execute the above-described process on the next transaction information.

When it is determined in step S4305 that no unprocessed transaction information is remaining, the completion of the grouping is reported to the distribution unit 42. Then, the flow returns to step S4301.

[Distribution Unit Algorithm]

Figure 36:
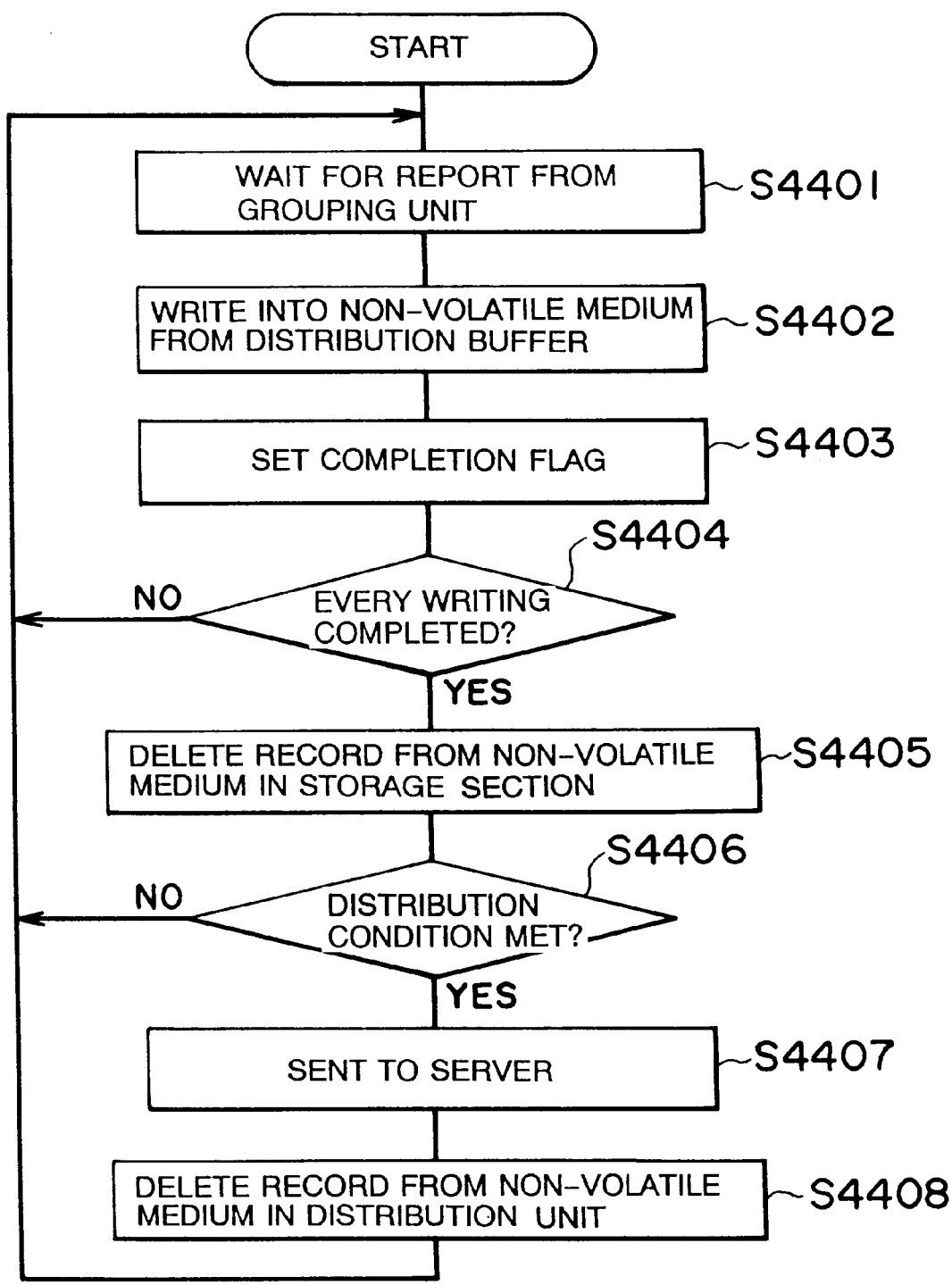
FIG. 36 is a flowchart illustrating a sequence of processes executed by a distribution unit in FIG. 31.

FIG. 36 is a flowchart illustrating an algorithm executed by the distribution unit 42. The distribution unit 42 executes a plurality of algorithms in parallel for each distribution buffer 42*a*. This flowchart starts when the interserver data association apparatus 1 is powered on. In step S4401, the distribution unit 42 awaits for the report of the completion of the grouping from the grouping unit 44 in step S4306.

In the next step S4402, the transaction information stored in the distribution buffer 42*a* is written in the second non-volatile medium 42*b*. A completion flag is set in the complete indication areas as shown in FIG. 9.

It is then checked in step S4404 if writing has been completed for every server in the complete indication areas. If all the writing has not been completed, the flow returns to step S4401. If all the writing has been completed, on the other hand, the flow proceeds to step S4405.

In step S4405, the associated record is deleted from the first non-volatile medium 43*a* in the storage section 43. Then, the flow proceeds to S4406.

In this step S4406, it is checked if the distribution condition is met. This check is made by referring to the trigger condition in the associated distribution definition 40*c*.

When the distribution condition is not met, the flow returns to step S4401. When the distribution condition is satisfactory, on the other hand, the transaction information stored in the target second non-volatile medium 42*b* is transmitted to the associated server 3*a*, 3*b* or 3*c* in step S4407. In the subsequent step S4407, the record where the transmitted transaction information is described is deleted from the second non-volatile medium 42*b*. Then, the flow returns to step S4401.

<Specific Example of Processing>

A specific example of the processing in the above-described algorithm will be discussed below. The following description will be given on the premise that transaction information have been transmitted from the transmission server 2 consecutively in the order as shown in FIG. 4. It is assumed that the contents of the acquisition definition 40*a*, the extended mapping definition 40*b* and the distribution definitions 40*c* are as illustrated in FIG. 32. It is also assumed that the processes in FIGS. 33 through 36 are executed at a sufficiently high speed and the time lag needed for the data transfer among the individual buffers 4, 3*a*–3*c* and the individual non-volatile media 43*a* and 42*b* is negligible.

Figure 37:
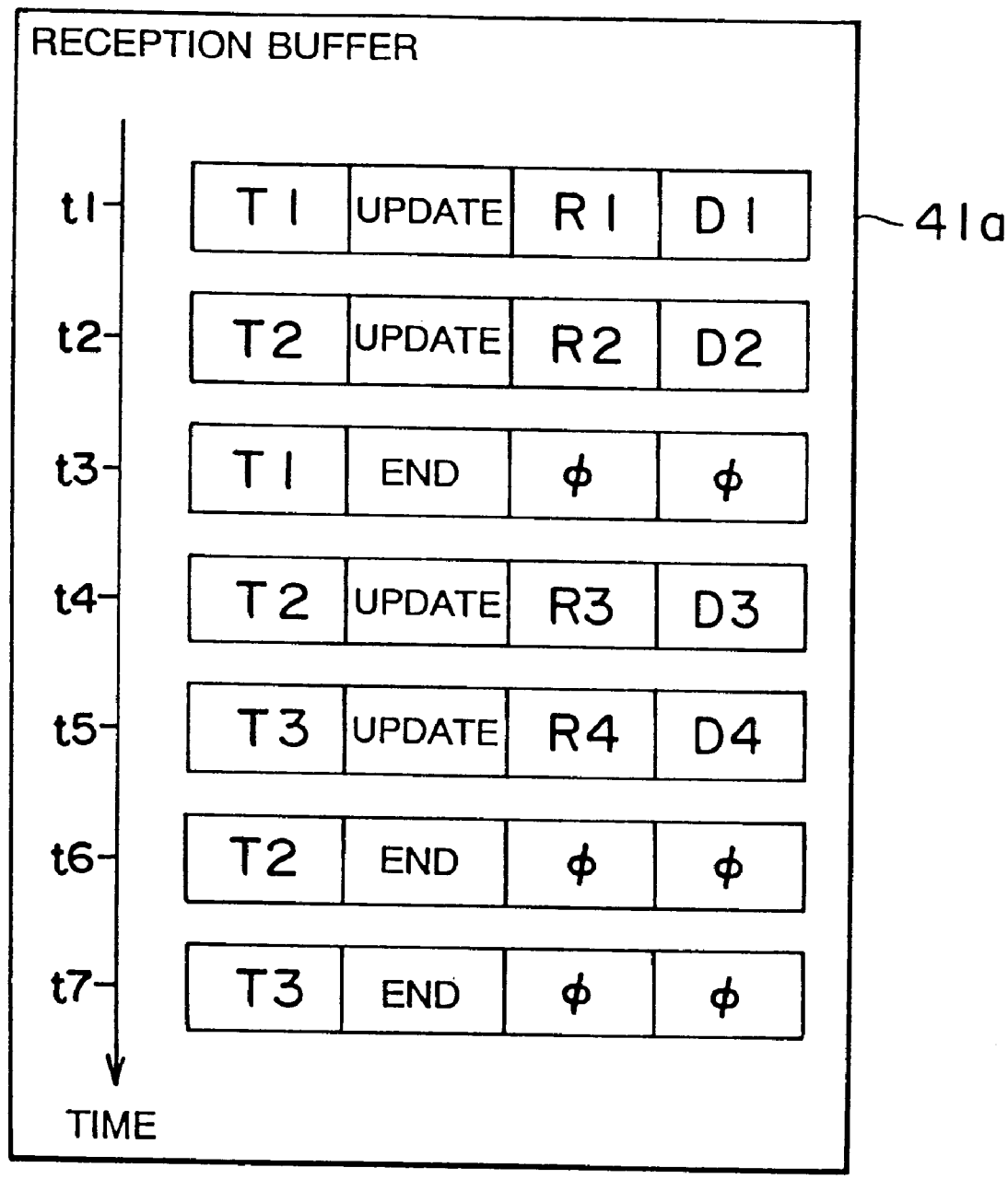
FIG. 37 is a diagram showing an example of what is received by a reception buffer in FIG. 31.

In this case, transaction information are sequentially written in the reception buffer 41*a* at the timings shown in FIG. 37.

Figure 38:
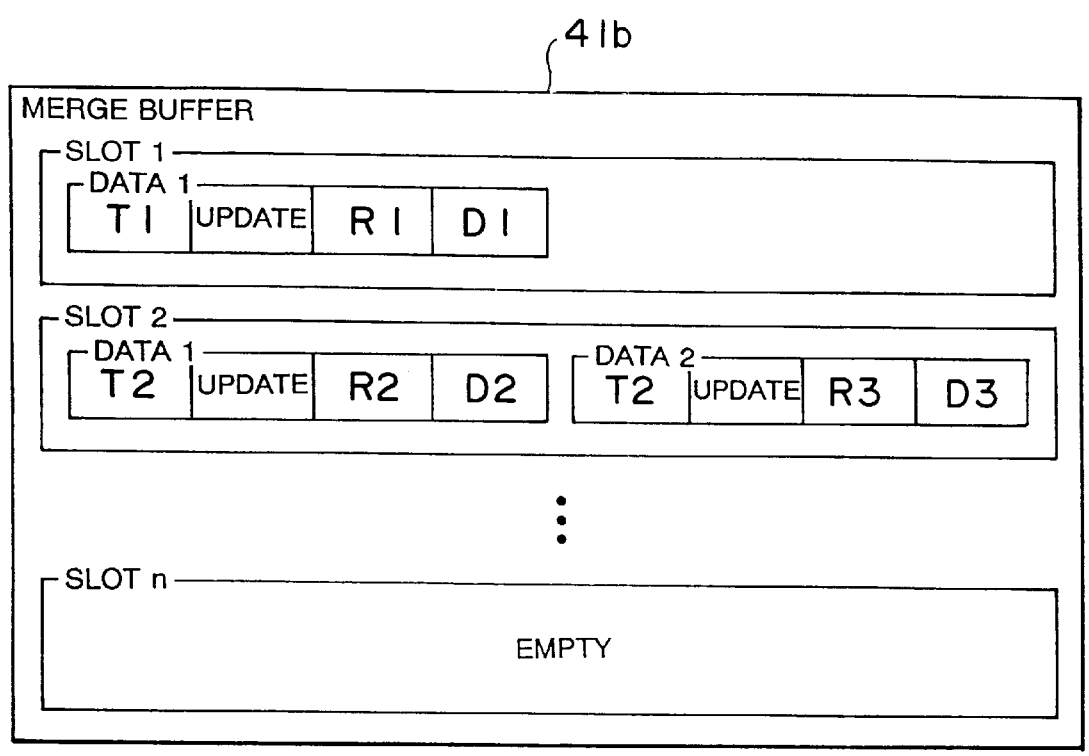
FIG. 38 is a diagram showing an example of what is received by a merge buffer in FIG. 31.

Since the acquisition unit 41 is performing the process in FIG. 33 at the same time as the writing of the transaction information, each transaction information is written in the merge buffer 41*b* in the form shown in FIG. 38. FIG. 38 shows the status at time t7. The slot 1 in FIG. 38 corresponds to the transaction T1, and the slot 2 corresponds to the transaction T2. As the transactions only up to T3 have occurred at the point of time t7, the slot n (n>3) is empty. Since the resource R4 is not defined in the acquisition definition 40*a*, the transaction information about the resource (R4) at time t5 is discarded. (step S4104).

As a result of executing the process illustrated in FIGS. 33 and 34, the transaction information stored in the slot 1 is transferred to the storage section 43 at time t3 and the transaction information stored in the slot 2 is transferred to the storage section 43 at time t6 (steps S4109 and S4202).

Figure 39:
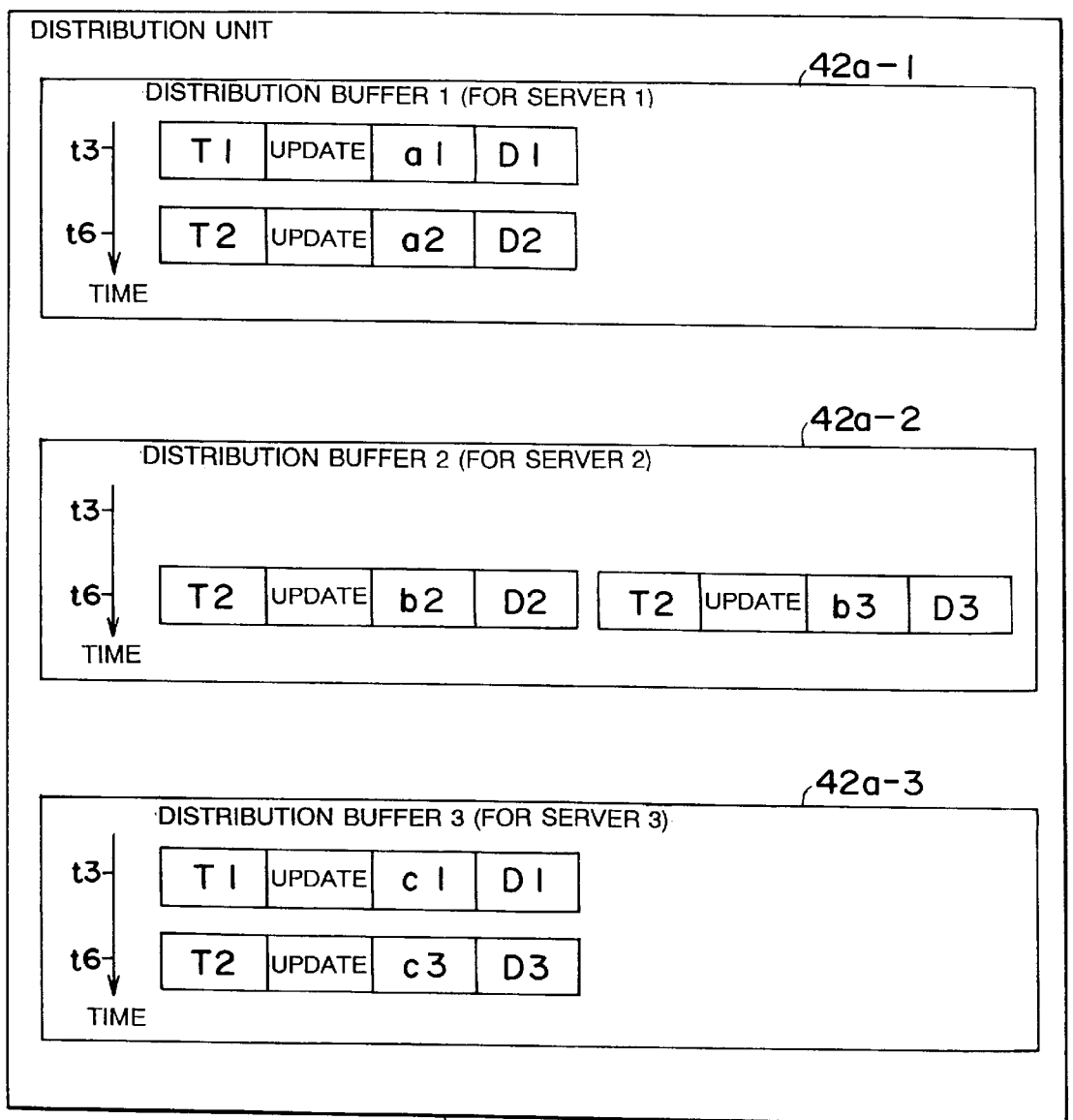
FIG. 39 is a diagram showing an example of what is received by each distribution buffer in FIG. 31.

The process in FIG. 35 is executed in the grouping unit 44. As shown in FIG. 39, therefore, when the grouping unit 44 is informed of the record number at time t3, the grouping unit 44 transfers the transaction information (R1) corresponding to data 1 in the slot 1 to the group buffer 44*a* from the first non-volatile medium 43*a* (step S4302). In accordance with the extended mapping definition 40*b*, the transaction information (R1) is transferred to the distribution buffer 42*a*-1 for the server 1 as transaction information (a1) and to the distribution buffer 42*a*-3 for the server 3 as transaction information (c1) (step S4304). Likewise, when the grouping unit 44 is informed of the record number at time t6, the grouping unit 44 transfers the transaction information (R2) corresponding to data 1 in the slot 2 and transaction information (R3) corresponding to data 2 in the slot 2 to the grouping buffer 44*a* from the first non-volatile medium 43*a* (step S4302). In accordance with the extended mapping definition 40*b*, the transaction information (R2) is transferred to the distribution buffer 42*a*-1 for the server 1 as transaction information (a2) and to the distribution buffer 42*a*-2 for the server 2 as transaction information (b2) (step S4304). In accordance with the extended mapping definition 40*b*, the transaction information (R3) is transferred to the distribution buffer 42*a*-2 for the server 2 as transaction information (b3) and to the distribution buffer 42*a*-3 for the server 3 as transaction information (c3) (step S4304).

The process in FIG. 36 is executed in parallel in the distribution unit 42 in association with the individual distribution buffers 42*a*. Therefore, the transaction information stored in each distribution buffer 42*a* are transferred to the second non-volatile medium 42*b* (step S4402). The transaction information stored in the second non-volatile medium 42*b*-1 for the server 1 are transmitted to the server 1 every time ten pieces of transmission information are collected in the second non-volatile medium 42*b*, the transaction information stored in the second non-volatile medium 42*b*-2 for the server 2 are transmitted to the server 2 at 5 o'clock every day, and the transaction information stored in the second non-volatile medium 42*b*-3 for the server 3 are transmitted to the server 3 every hour (step S4407).

<Advantage of Embodiment>

As described above, the fourth embodiment has all the advantages of the third embodiment. In the fourth embodiment, the second non-volatile medium 42*b* is provided in the distribution unit 42 in association with each distribution buffer 42*a* to make data non-volatile. When any reception server or the interserver data association apparatus fails, therefore, it is unnecessary to return the process to the data reading from the storage section so that data distribution can be resumed promptly, thus improving the reliability of the interserver data association apparatus.

The essential elements of the present invention can allow for data association among a plurality of reception servers and a one transmission server based on the data transmitted from the transmission server. Further, the provision of the storage section can maintain the operational independency of the reception servers and can prevent data from being lost accidentally.

The invention being thus described, it will be obvious that the same may be varied in many ways, such variations are not to be regarded as a departure from the spirit and scope of the invention, and all such modifications as would be obvious to one skilled in the art are intended to be included within the scope of the following claims.

What is claimed is:

1. An interserver data association apparatus for transmitting contents of manipulation of a database in a transmission server to a plurality of reception servers, said apparatus comprising:

reception means for receiving data about said manipulation of said database sent from said transmission server;

timing definition information storing means for storing definition information for defining a condition about data transmission for each of said plurality of reception servers; and distribution means for distributing said data, received by said reception means, to said plurality of reception servers according to said definition information stored in said timing definition information storing means.

2. An interserver data association apparatus for transmitting contents of manipulation of a database in a transmission server to a plurality of reception servers, said apparatus comprising:

reception means for receiving data about said manipulation of said database sent from said transmission server;

resource definition information storing means for storing definition information for defining which resource being sent to which reception server; and, distribution means for distributing said data, received by said reception means, to said plurality of reception servers according to said definition information stored in said resource definition information storing means.

3. The interserver data association apparatus according to claim 1, further comprising:

a storage section including a non-volatile memory for storing data about said manipulation of said database.

4. The interserver data association apparatus according to claim 3, wherein said storage section is provided in said distribution means and stores data immediately before distribution to said reception servers.

5. The interserver data association apparatus according to claim 2, further comprising:

a storage section including a non-volatile memory for storing data received by said reception means.

6. The interserver data association apparatus according to claim 5, further comprising:

a buffer to which data read from said storage section is written.

7. The interserver data association apparatus according to claim 1, wherein said reception means groups data about a database manipulation sent from said transmission server for each transaction executed in said transmission server.

8. The interserver data association apparatus according to claim 5, wherein said reception means groups data about a database manipulation sent from said transmission server for each transaction executed in said transmission server and transmits said data to said storage section in an ending order of transactions.

9. The interserver data association apparatus according to claim 1, wherein said data about said manipulation of said database includes information for specifying a transaction which has performed said database manipulation, information for specifying a resource on which said database manipulation has been performed, a type of said database manipulation and information about contents of said resource after said database manipulation.

10. An interserver data association apparatus for transmitting contents of manipulation of a database in a transmission server to a plurality of reception servers, said apparatus comprising:

reception means for receiving data about said manipulation of said database sent from said transmission server;

transmission definition information storing means for storing definition information for defining type of data to be transmitted to each of said plurality of reception servers:

identification means for identifying only data requested by said reception servers from data received by said reception means, according to said transmission definition information stored in said definition storing means: and distribution means for distributing said data, identified by said identification means, to each reception server.

11. An interserver data association apparatus for transmitting contents of manipulation of a database in a transmission server to a plurality of reception servers, said apparatus comprising:

reception means for receiving data about said manipulation of said database sent from said transmission server;

resource definition information storing means for storing definition information for defining which resource being sent to which reception server;

timing definition information storing means for storing definition information for defining a condition about data transmission for each of said plurality of reception servers; and, distribution means for distributing said data, received by said reception means, to said plurality of reception servers according to said definition information stored in said resource definition information storing means and said timing definition information storing means.

* * * * *